US008341014B2

(12) United States Patent
Bobak et al.

(10) Patent No.: US 8,341,014 B2
(45) Date of Patent: Dec. 25, 2012

(54) RECOVERY SEGMENTS FOR COMPUTER BUSINESS APPLICATIONS

(75) Inventors: Mythili K. Bobak, Lagrangeville, NY (US); Chun-Shi Chang, Poughkeepsie, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/965,855

(22) Filed: Dec. 28, 2007

(65) Prior Publication Data

US 2009/0171707 A1    Jul. 2, 2009

(51) Int. Cl.
*G06Q 30/00* (2006.01)
(52) U.S. Cl. .................................. 705/8; 705/7; 705/9
(58) Field of Classification Search .................. 705/1, 7, 705/8, 9
See application file for complete search history.

(56) References Cited

U.S. PATENT DOCUMENTS

| | | | |
|---|---|---|---|
| 5,023,873 A | 6/1991 | Stevenson et al. ............. 371/8.2 |
| 5,386,561 A | 1/1995 | Huynh et al. | |
| 5,452,452 A | 9/1995 | Gaetner et al. | |
| 5,481,694 A | 1/1996 | Chao et al. .................... 395/439 |
| 5,537,542 A | 7/1996 | Eilert et al. | |
| 5,604,863 A | 2/1997 | Allen et al. | |
| 5,631,831 A | 5/1997 | Bird et al. | |
| 5,652,908 A | 7/1997 | Douglas et al. | |
| 5,734,837 A | 3/1998 | Flores et al. | |
| 5,790,780 A | 8/1998 | Brichta et al. | |
| 5,797,005 A | 8/1998 | Bahls et al. | |
| 5,797,129 A | 8/1998 | Rohan | |
| 5,826,080 A | 10/1998 | Dworzecki | |
| 5,887,168 A | 3/1999 | Bahls et al. | |
| 6,012,044 A | 1/2000 | Maggioncalda et al. | |
| 6,012,152 A | 1/2000 | Douik et al. | |
| 6,041,306 A | 3/2000 | Du et al. | |
| 6,336,138 B1 | 1/2002 | Caswell et al. | |
| 6,385,613 B1 | 5/2002 | Grewell et al. ................... 707/8 |
| 6,393,386 B1 | 5/2002 | Zager et al. | |
| 6,393,485 B1 | 5/2002 | Chao et al. .................... 709/231 |
| 6,408,277 B1 | 6/2002 | Nelken | |
| 6,449,688 B1 | 9/2002 | Peters et al. .................. 711/112 |
| 6,480,944 B2 | 11/2002 | Bradshaw et al. | |
| 6,625,751 B1 | 9/2003 | Starovic et al. | |

(Continued)

FOREIGN PATENT DOCUMENTS

WO    WO 99/10814    3/1999

OTHER PUBLICATIONS

Office Action for U.S. Appl. No. 11/966,495 dated Oct. 29, 2009.

(Continued)

*Primary Examiner* — Nga B. Nguyen
(74) *Attorney, Agent, or Firm* — Dennis Jung, Esq.; Blanche E. Schiller, Esq.; Heslin Rothenberg Farley & Mesiti P.C.

(57) ABSTRACT

Recovery Segments are defined and employed to facilitate management of a customer's environment. A Recovery Segment is a runtime usable representation of resources and relationships between those resources associated with a business application. That representation is usable in managing the business application. Associated with the representation is one or more goals to be met by resources of the representation.

25 Claims, 30 Drawing Sheets

U.S. PATENT DOCUMENTS

| | | | |
|---|---|---|---|
| 6,732,118 B2 | 5/2004 | Hermann et al. | |
| 6,785,768 B2 | 8/2004 | Peters et al. | 711/112 |
| 6,862,696 B1 | 3/2005 | Voas et al. | |
| 6,874,010 B1 | 3/2005 | Sargent | |
| 6,934,247 B2 | 8/2005 | Bhattal et al. | 370/216 |
| 6,954,786 B1 | 10/2005 | Vered et al. | |
| 6,983,321 B2 | 1/2006 | Trinon et al. | |
| 6,983,362 B1 | 1/2006 | Kidder et al. | |
| 7,032,186 B1 | 4/2006 | Gasser et al. | |
| 7,047,337 B2 | 5/2006 | Armstrong et al. | |
| 7,058,947 B1 | 6/2006 | Raja et al. | |
| 7,111,297 B1 | 9/2006 | Sankaranarayan et al. | |
| 7,197,749 B2 | 3/2007 | Thornton et al. | |
| 7,243,267 B2 | 7/2007 | Klemm et al. | |
| 7,313,573 B2 | 12/2007 | Leung et al. | |
| 7,325,161 B1 | 1/2008 | Rakic et al. | |
| 7,395,537 B1 | 7/2008 | Brown et al. | |
| 7,409,356 B1 | 8/2008 | Geddes et al. | |
| 7,437,611 B2 | 10/2008 | Agarwal et al. | |
| 7,490,265 B2 | 2/2009 | Baskey et al. | |
| 7,499,954 B2 | 3/2009 | Cherkauer et al. | |
| 7,509,529 B2 | 3/2009 | Colucci et al. | |
| 7,529,981 B2 | 5/2009 | Childress et al. | |
| 7,536,585 B1 | 5/2009 | Keeton et al. | |
| 7,568,019 B1 | 7/2009 | Bhargava et al. | |
| 7,587,483 B1 | 9/2009 | Florissi et al. | |
| 7,610,512 B2 | 10/2009 | Gerber | |
| 7,620,953 B1 | 11/2009 | Tene et al. | |
| 7,627,728 B1 | 12/2009 | Roeck et al. | |
| 7,650,341 B1 | 1/2010 | Oratovsky et al. | |
| 7,707,173 B2 | 4/2010 | Nanavati et al. | |
| 7,730,363 B2 | 6/2010 | Takezawa et al. | |
| 7,747,730 B1 | 6/2010 | Harlow | |
| 7,774,457 B1 | 8/2010 | Talwar et al. | |
| 7,818,421 B2 | 10/2010 | Machida | |
| 7,933,872 B2 | 4/2011 | Kulkarni et al. | |
| 7,934,119 B2 | 4/2011 | Takamoto et al. | |
| 7,937,706 B2 | 5/2011 | Casotto | |
| 7,958,393 B2 | 6/2011 | Bobak et al. | |
| 7,962,590 B1 | 6/2011 | Or et al. | |
| 8,051,106 B2 | 11/2011 | Bird | |
| 8,260,893 B1 | 9/2012 | Bandhole et al. | |
| 2001/0056398 A1 | 12/2001 | Scheirer | |
| 2001/0056554 A1 | 12/2001 | Chrabaszcz | |
| 2002/0022952 A1* | 2/2002 | Zager et al. | 703/22 |
| 2002/0049749 A1* | 4/2002 | Helgeson et al. | 707/3 |
| 2002/0059512 A1 | 5/2002 | Desjardins | |
| 2002/0069102 A1 | 6/2002 | Vellante et al. | |
| 2002/0078130 A1 | 6/2002 | Thornton et al. | |
| 2002/0078381 A1 | 6/2002 | Farley et al. | |
| 2002/0091991 A1 | 7/2002 | Castro | |
| 2002/0194045 A1 | 12/2002 | Shay et al. | |
| 2002/0198727 A1 | 12/2002 | Ann et al. | |
| 2003/0051186 A1* | 3/2003 | Boudnik et al. | 714/2 |
| 2003/0056013 A1 | 3/2003 | Laschkewitsch et al. | |
| 2003/0084100 A1 | 5/2003 | Gahan et al. | |
| 2003/0093672 A1 | 5/2003 | Cichowlas | |
| 2003/0135384 A1 | 7/2003 | Nguyen | |
| 2003/0139956 A1 | 7/2003 | Guenther et al. | |
| 2003/0200482 A1 | 10/2003 | Sullivan | |
| 2003/0212580 A1 | 11/2003 | Shen | |
| 2003/0212685 A1 | 11/2003 | Rakotoarivelo et al. | |
| 2003/0225602 A1 | 12/2003 | Hagmann et al. | |
| 2004/0034553 A1 | 2/2004 | Cole et al. | |
| 2004/0054690 A1 | 3/2004 | Hillerbrand et al. | |
| 2004/0078373 A1 | 4/2004 | Ghoneimy et al. | |
| 2004/0119752 A1 | 6/2004 | Beringer et al. | |
| 2004/0143470 A1* | 7/2004 | Myrick et al. | 705/7 |
| 2004/0158777 A1 | 8/2004 | Bae et al. | |
| 2004/0162741 A1 | 8/2004 | Flaxer et al. | |
| 2004/0181476 A1 | 9/2004 | Smith et al. | |
| 2004/0186905 A1 | 9/2004 | Young et al. | |
| 2004/0193476 A1 | 9/2004 | Aerdts | |
| 2004/0199768 A1 | 10/2004 | Nail | |
| 2004/0210452 A1* | 10/2004 | Aboujaoude et al. | 705/1 |
| 2004/0243699 A1 | 12/2004 | Koclanes et al. | |
| 2005/0015641 A1 | 1/2005 | Alur et al. | |
| 2005/0033600 A1 | 2/2005 | Geddes et al. | |
| 2005/0043977 A1 | 2/2005 | Ahern et al. | |
| 2005/0049906 A1 | 3/2005 | Leymann et al. | |
| 2005/0071470 A1 | 3/2005 | O'Brien et al. | |
| 2005/0086091 A1 | 4/2005 | Trumbly et al. | |
| 2005/0091351 A1 | 4/2005 | Badovinatz et al. | |
| 2005/0096949 A1 | 5/2005 | Aiber et al. | |
| 2005/0119905 A1 | 6/2005 | Wong et al. | |
| 2005/0125768 A1* | 6/2005 | Wong et al. | 717/100 |
| 2005/0172306 A1 | 8/2005 | Agarwal et al. | |
| 2005/0177406 A1 | 8/2005 | Facciorusso et al. | |
| 2005/0198244 A1 | 9/2005 | Eilam et al. | |
| 2005/0228852 A1* | 10/2005 | Santos et al. | 709/200 |
| 2005/0235248 A1 | 10/2005 | Victoria et al. | |
| 2005/0262242 A1 | 11/2005 | Byers et al. | |
| 2006/0004265 A1 | 1/2006 | Pulkkinen et al. | |
| 2006/0010234 A1 | 1/2006 | Reedy et al. | |
| 2006/0020866 A1 | 1/2006 | Lo et al. | |
| 2006/0037022 A1* | 2/2006 | Byrd et al. | 718/104 |
| 2006/0041505 A1 | 2/2006 | Enyart | |
| 2006/0064335 A1 | 3/2006 | Goldszmidt et al. | |
| 2006/0074731 A1 | 4/2006 | Green et al. | |
| 2006/0074735 A1 | 4/2006 | Shukla et al. | |
| 2006/0074736 A1 | 4/2006 | Shukla et al. | |
| 2006/0074993 A1 | 4/2006 | Pulamarasetti et al. | |
| 2006/0106626 A1 | 5/2006 | Jeng et al. | |
| 2006/0111921 A1 | 5/2006 | Chang et al. | |
| 2006/0112383 A1 | 5/2006 | Chang et al. | |
| 2006/0117221 A1 | 6/2006 | Fisher et al. | |
| 2006/0123022 A1 | 6/2006 | Bird | |
| 2006/0129562 A1 | 6/2006 | Pulamarasetti et al. | |
| 2006/0161444 A1 | 7/2006 | Lubrecht et al. | |
| 2006/0179136 A1 | 8/2006 | Loboz et al. | |
| 2006/0190368 A1 | 8/2006 | Kesterman | |
| 2006/0190583 A1 | 8/2006 | Whalen | |
| 2006/0190775 A1 | 8/2006 | Aggarwal et al. | |
| 2006/0218558 A1 | 9/2006 | Torii et al. | |
| 2006/0224702 A1 | 10/2006 | Schmidt et al. | |
| 2006/0245354 A1 | 11/2006 | Gao et al. | |
| 2006/0245369 A1 | 11/2006 | Schimmelpfeng et al. | |
| 2006/0248546 A1 | 11/2006 | Andreev et al. | |
| 2006/0259526 A1 | 11/2006 | Booz et al. | |
| 2006/0287875 A1 | 12/2006 | Reddy et al. | |
| 2006/0293942 A1 | 12/2006 | Chaddha et al. | |
| 2007/0011331 A1 | 1/2007 | Morimoto et al. | |
| 2007/0027734 A1 | 2/2007 | Hughes | |
| 2007/0038490 A1 | 2/2007 | Joodi | |
| 2007/0038492 A1 | 2/2007 | Ryan et al. | |
| 2007/0067296 A1 | 3/2007 | Malloy et al. | |
| 2007/0079097 A1 | 4/2007 | Karnowski et al. | |
| 2007/0100712 A1 | 5/2007 | Kilpatrick et al. | |
| 2007/0112847 A1 | 5/2007 | Dublish et al. | |
| 2007/0143166 A1 | 6/2007 | Leymann et al. | |
| 2007/0150571 A1 | 6/2007 | Haga et al. | |
| 2007/0179826 A1 | 8/2007 | Cutlip et al. | |
| 2007/0198678 A1 | 8/2007 | Dieberger et al. | |
| 2007/0234408 A1 | 10/2007 | Burch et al. | |
| 2007/0266029 A1 | 11/2007 | Baskey et al. | |
| 2007/0276885 A1 | 11/2007 | Valiyaparambil et al. | |
| 2007/0286219 A1 | 12/2007 | Knop et al. | |
| 2007/0294406 A1 | 12/2007 | Suer et al. | |
| 2007/0300204 A1 | 12/2007 | Andreev et al. | |
| 2008/0005739 A1 | 1/2008 | Sadiq et al. | |
| 2008/0016335 A1 | 1/2008 | Takahashi et al. | |
| 2008/0052719 A1 | 2/2008 | Briscoe et al. | |
| 2008/0063423 A1 | 3/2008 | Matoba | |
| 2008/0140495 A1 | 6/2008 | Bhamidipaty et al. | |
| 2008/0215909 A1 | 9/2008 | Bretschneider et al. | |
| 2008/0294777 A1 | 11/2008 | Karve et al. | |
| 2008/0295100 A1 | 11/2008 | Ainsworth | |
| 2009/0037363 A1 | 2/2009 | Kozlov et al. | |
| 2009/0077210 A1 | 3/2009 | Musman et al. | |
| 2009/0125751 A1 | 5/2009 | Dawson et al. | |
| 2009/0150456 A1 | 6/2009 | Balasubramanian et al. | |
| 2009/0150887 A1 | 6/2009 | Sanghvi et al. | |
| 2009/0171703 A1 | 7/2009 | Bobak et al. | |
| 2009/0171704 A1 | 7/2009 | Bobak et al. | |
| 2009/0171705 A1 | 7/2009 | Bobak et al. | |
| 2009/0171706 A1 | 7/2009 | Bobak et al. | |
| 2009/0171708 A1 | 7/2009 | Bobak et al. | |

| | | | |
|---|---|---|---|
| 2009/0171730 A1 | 7/2009 | Bobak et al. | |
| 2009/0171731 A1 | 7/2009 | Bobak et al. | |
| 2009/0171732 A1 | 7/2009 | Bobak et al. | |
| 2009/0171733 A1 | 7/2009 | Bobak et al. | |
| 2009/0172149 A1 | 7/2009 | Bobak et al. | |
| 2009/0172460 A1 | 7/2009 | Bobak et al. | |
| 2009/0172461 A1 | 7/2009 | Bobak et al. | |
| 2009/0172470 A1 | 7/2009 | Bobak et al. | |
| 2009/0172668 A1 | 7/2009 | Bobak et al. | |
| 2009/0172669 A1 | 7/2009 | Bobak et al. | |
| 2009/0172670 A1 | 7/2009 | Bobak et al. | |
| 2009/0172671 A1 | 7/2009 | Bobak et al. | |
| 2009/0172674 A1 | 7/2009 | Bobak et al. | |
| 2009/0172682 A1 | 7/2009 | Bobak et al. | |
| 2009/0172687 A1 | 7/2009 | Bobak et al. | |
| 2009/0172688 A1 | 7/2009 | Bobak et al. | |
| 2009/0172689 A1 | 7/2009 | Bobak et al. | |
| 2009/0172769 A1 | 7/2009 | Bobak et al. | |
| 2009/0249337 A1 | 10/2009 | Vasilevsky et al. | |
| 2010/0280863 A1* | 11/2010 | Wilcock et al. | 705/7 |

OTHER PUBLICATIONS

Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," http://www.parasoft.com/jsp/products/home.jsp?product=BPEL.
"BPEL Project", http://www.eclipse.org/bpel/.
"Factor Analysis Using SAS PROC Factor", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnav.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/965,872 dated Jul. 6, 2010.
Final Office Action for U.S. Appl. No. 11/965,897 dated Sep. 17, 2010.
Final Office Action for U.S. Appl. No. 11/966,495 dated May 14, 2010.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13 (Office Action for U.S. Appl. No. 11/965,926—no further date information available.).
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339 (Office Action for U.S. Appl. No. 11/965,845—no further date information available.).
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Final Office Action for U.S. Appl. No. 11/965,926 dated Jul. 19, 2011.
Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520, filed Dec. 22, 2010 entitled "Real-Time Information Technology Environments".
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Final Office Action for U.S. Appl. No. 11/965,922 dated Jul. 29, 2011.
Office Action for U.S. Appl. No. 11/965,845 dated Jul. 29, 2011.
Office Action for U.S. Appl. No. 11/965,832 dated Aug. 23, 2011.
Office Action for U.S. Appl. No. 11/965,902 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.
Office Action for U.S. Appl. No. 11/965,894 dated Jul. 18, 2011.
Final Office Action for U.S. Appl. No. 11/965,832 dated Jan. 9, 2012.
Final Office Action for U.S. Appl. No. 11/965,889 dated Jan. 11, 2012.
Office Action for U.S. Appl. No. 11/966,495 dated Feb. 1, 2012.
Final Office Action for U.S. Appl. No. 11/965,862 dated Feb. 14, 2012.
Office Action for U.S. Appl. No. 11/965,872 dated Feb. 16, 2012.
Final Office Action for U.S. Appl. No. 11/965,951 dated Feb. 22, 2012.

Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford, C. H. et al., "Toward an on Demand Service-Oriented Architecture," IBM Systems Journal, vol. 44, No. 1, 2005, pp. 81-107.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Office Action for U.S. Appl. No. 11/965,899 dated Aug. 28, 2012.
Final Office Action for U.S. Appl. No. 11/965,922 dated Aug. 28, 2012.
Final Office Action for U.S. Appl. No. 11/965,845 dated Aug. 29, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.

\* cited by examiner

FIG. 6A

EVENT LOG

| ! | MESSAGE | RESOURCE | DATE |
|---|---------|----------|------|
| ! | CONTAINMENT REGION HAS RECOVERED | CONTAINMENT1 | APR 18, 2006 10:50:52.193 |
| X | CONTAINMENT REGION CREATED FOR RESOURCE FAILURE | CONTAINMENT1 | APR 18, 2006 10:50:52.103 |
| ! | CONTAINMENT REGION HAS RECOVERED | CONTAINMENT3 | APR 18, 2006 10:50:51.982 |
| X | DETECTED DYNAMIC MEMBERSHIP CHANGE: ACTIVE POLICY REED... | RECOVERYSEGMENT2 | APR 18, 2006 10:12:25.696 |
| X | THIS RESOURCE HAS ENTERED AN UNRECOVERABLE STATE AND RED... | RECOVERY MANAGER2 | APR 18, 2006 10:12:25.696 |
| X | THIS RESOURCE HAS ENTERED AN UNRECOVERABLE STATE AND RED... | RECOVERY MANAGER1 | APR 18, 2006 10:12:14.770 |
| X | ACTIVATION OF POLICY "XYZ" HAS FAILED | RECOVERY SEGMENT1 | APR 18, 2006 10:12:14.760 |
| ! | DETECTED DYNAMIC MEMBERSHIP CHANGE ACTIVE POLICY REED | RECOVERY SEGMENT2 | APR 18, 2006 10:10:25.696 |

THE RESOURCE "CODER 1 RECOVERY" HAS ENTERED AN UNRECOVERABLE STATE THAT REQUIRES YOUR INPUT. DO YOU WANT TO OPEN THE RESOURCE NOW?

[YES] [NO]

650

RECOVERY SEGMENTS FOR COMPUTER BUSINESS APPLICATIONS

TECHNICAL FIELD

This invention relates, in general, to managing customer environments to provide support for business resiliency, and in particular, to grouping resources to enable granular management of a customer's environment.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the hand-crafted recovery scheme.

SUMMARY OF THE INVENTION

Based on the foregoing, a need exists for a capability that facilitates management and aligns a customer's environment (e.g., for availability) with its information technology (IT) infrastructure. In particular, a need exists for a capability that enables the grouping of resources to facilitate granular management of a customer's environment.

The shortcomings of the prior art are overcome and additional advantages are provided through the provision of a computer implemented method, which includes, for instance, obtaining a set of information associated with a business application, the set of information including an identification of a plurality of resources associated with the business application and relationship information of one or more relationships between at least two resources of the plurality of resources; and creating a runtime usable representation of the set of information, the representation usable in managing the business application.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION OF THE INVENTION

Figure 1:
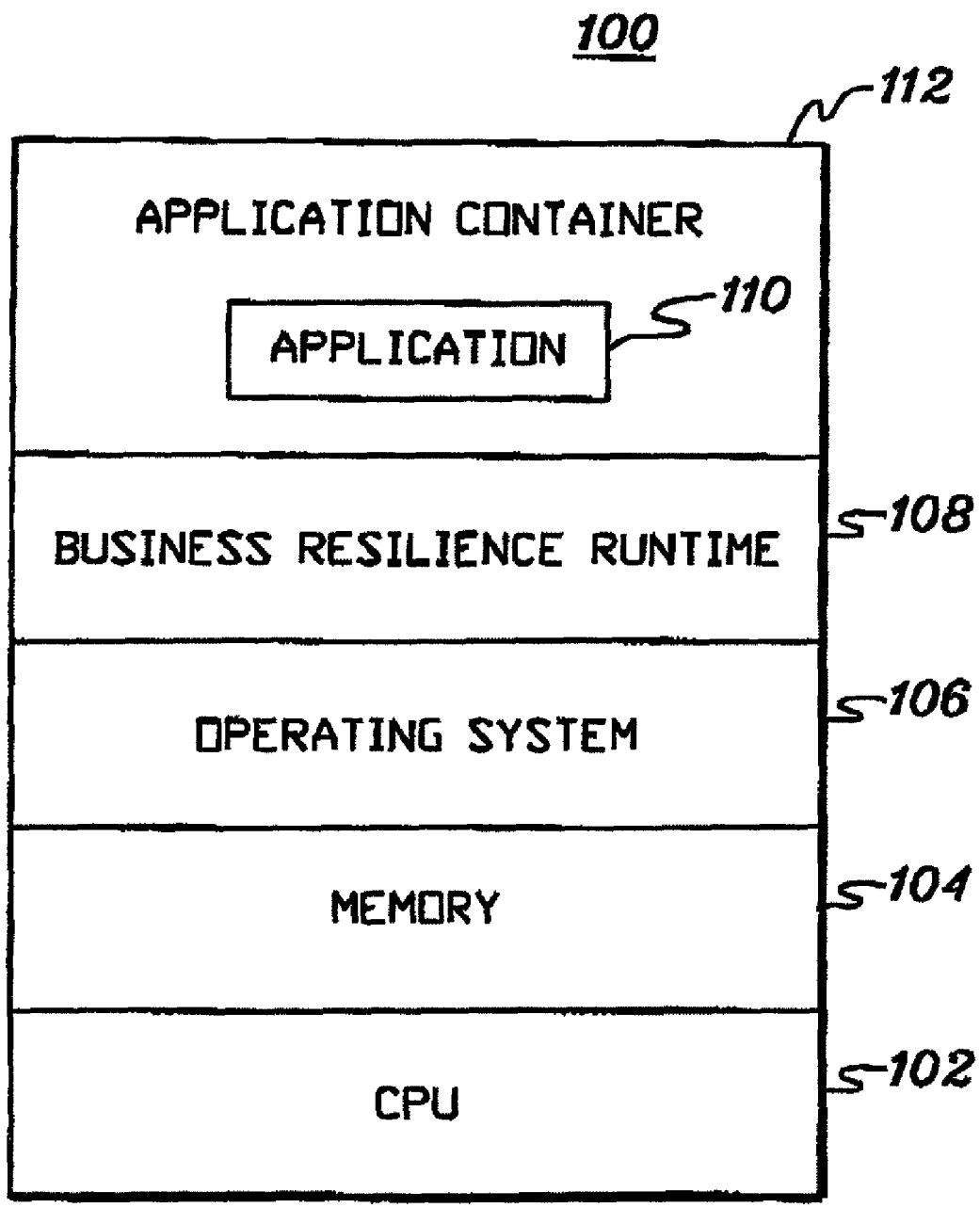
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:

What is my expected recovery time for a given application during "end of month close" system environment?

What is the longest component of that recovery time?

Can I expect to achieve the desired RTO during the "market open" for stock exchange or financial services applications?

What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?

18. Ability to incorporate operations from any vendors' resources for pre-conditioning or recovery workflows, including specification of which pre-conditioning operations have effect on recoveries, which operations have dependencies on others, either within vendor resources or across resources from multiple vendors.

19. Customer ability to modify pre-conditioning workflows, consistent with supported operations on resources.

20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.

21. Ability to divide pre-conditioning work between long running and immediate, nondisruptive short term actions.

22. Impact only the smallest set of resources required during recovery, to avoid negative residual or side effects for attempting to recover a broader set of resources than what is actually impacted by the failure.

23. Choosing recovery operations based on determination of which recovery actions address the minimal impact, to meet goal, and then prepare for subsequent escalation in event of failure of initial recovery actions.

24. Choosing a target for applications and operating systems (OS), based on customer co-location specifications, redundancy groups, and realtime system state.

25. Ability for customer to indicate specific effect that recovery of a given business process can have on another business process—to avoid situations where lower priority workloads are recovered causing disruption to higher priority workloads; handling situations where resources are shared.

26. Ability to prioritize ongoing recovery processing over configuration changes to an availability system, and over any other administration functions required for the availability system.

27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).

28. Allow for possible non-responsive resources or underlying infrastructure that does not have known maximum delays in response time in determining recovery actions, while not going beyond the allotted recovery time.

29. Allow customer to change quantified business recovery goals/targets without disruption to the existing recovery capability, with appropriate labeling of version of the policy to facilitate interaction with change management systems.

30. Allow customers to change logical groupings of resources that have assigned recovery goals, without disruption to the existing recovery capability, with changes versioned to facilitate interaction with change management systems.

31. Ability to specify customizable human tasks, with time specifications that can be incorporated into the goal achievement validation so customers can understand the full time involved for a recovery and where focusing on IT and people time is critical to reducing RTO.

32. There is a requirement/desire to implement dynamically modified redundancy groupings for those resources which are high volume—automatic inclusion based on a specified set of characteristics and a matching criteria.

33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
   Correlation and identification of dependencies between business functions and the supporting IT resources.
   Impact analysis of failures affecting business functions, across resources used within the business functions, including the applications and data.
   Isolation of failure scope to smallest set of resources, to ensure that any disruptive recovery actions effect only the necessary resources.

2. Rapid granular and graceful degradation of IT service.
   Discontinuation of services based on business priorities.
   Selection of alternate resources at various levels may include selection of hardware, application software, data, etc.
   Notifications to allow applications to tailor or reduce service consumption during times of availability constraints.

3. Integration of availability management with normal business operations and other core business processes.
   a Policy controls for availability and planned reconfiguration, aligned with business objectives.
   Encapsulation, integration of isolated point solutions into availability IT fabric, through identification of affected resources and operations initiated by the solutions, as well as business resiliency.
   Goal based policy support, associated with Recovery Segments that may be overlapped or nested in scope.
   Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:
1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
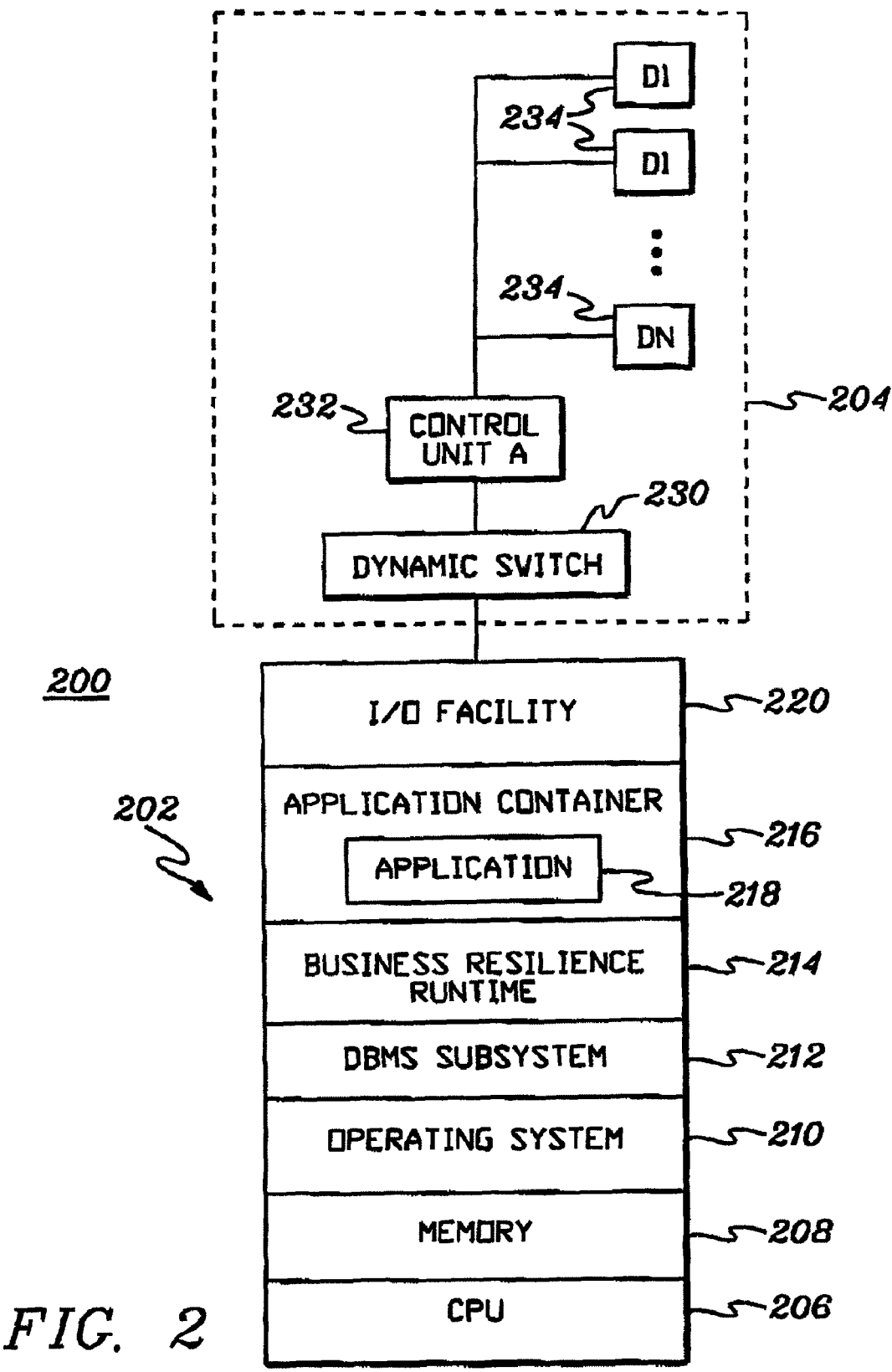
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
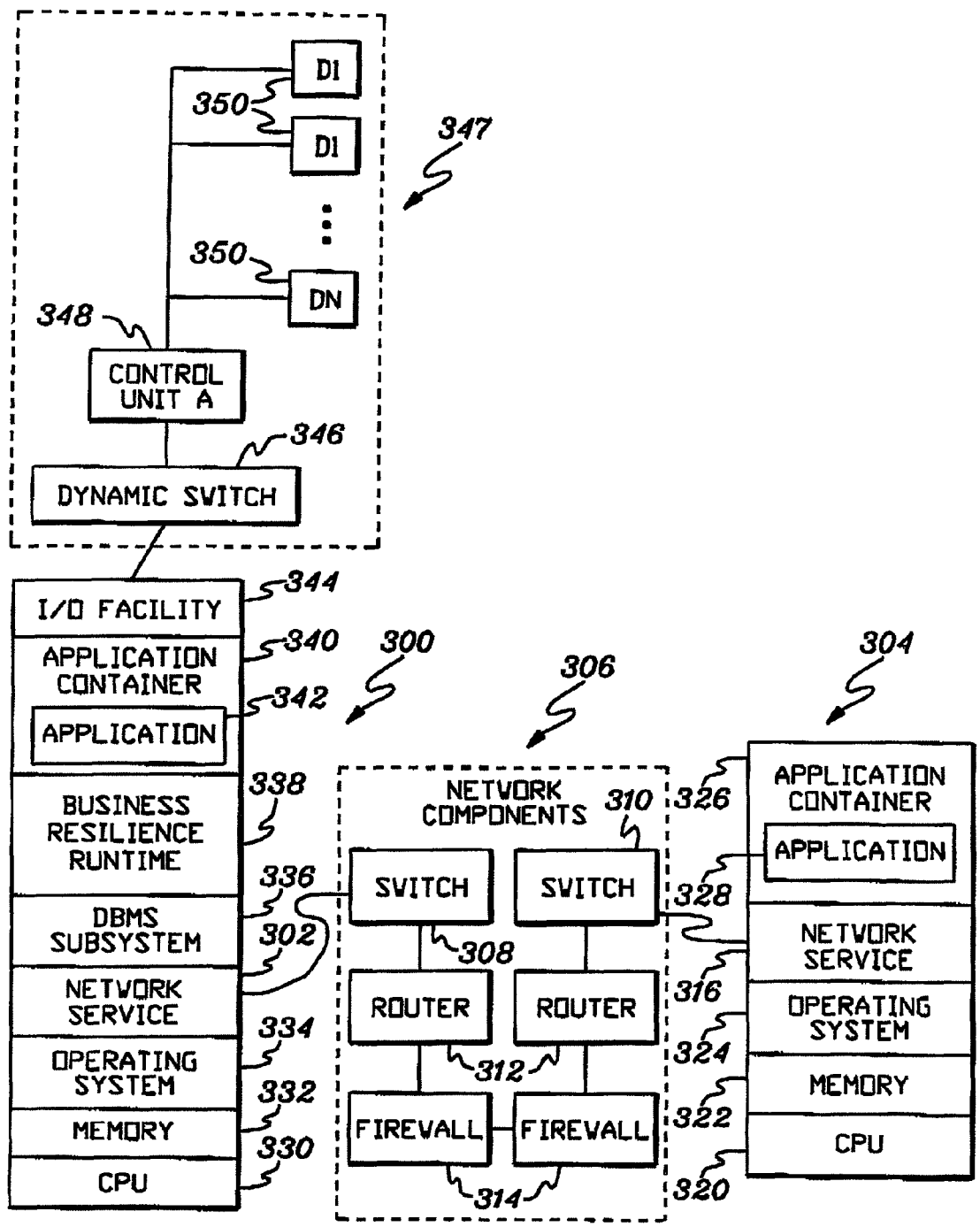
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
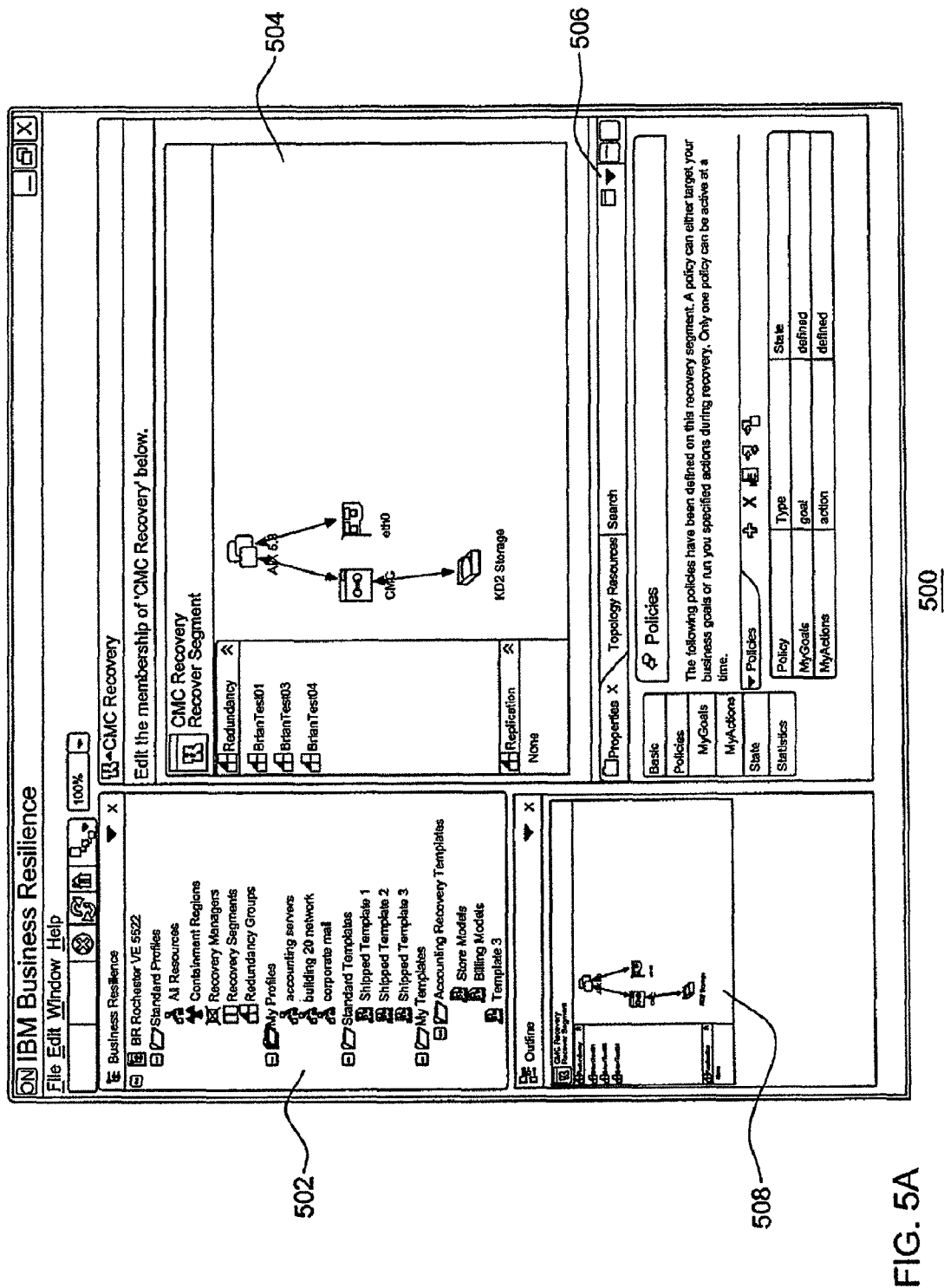
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View 506

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
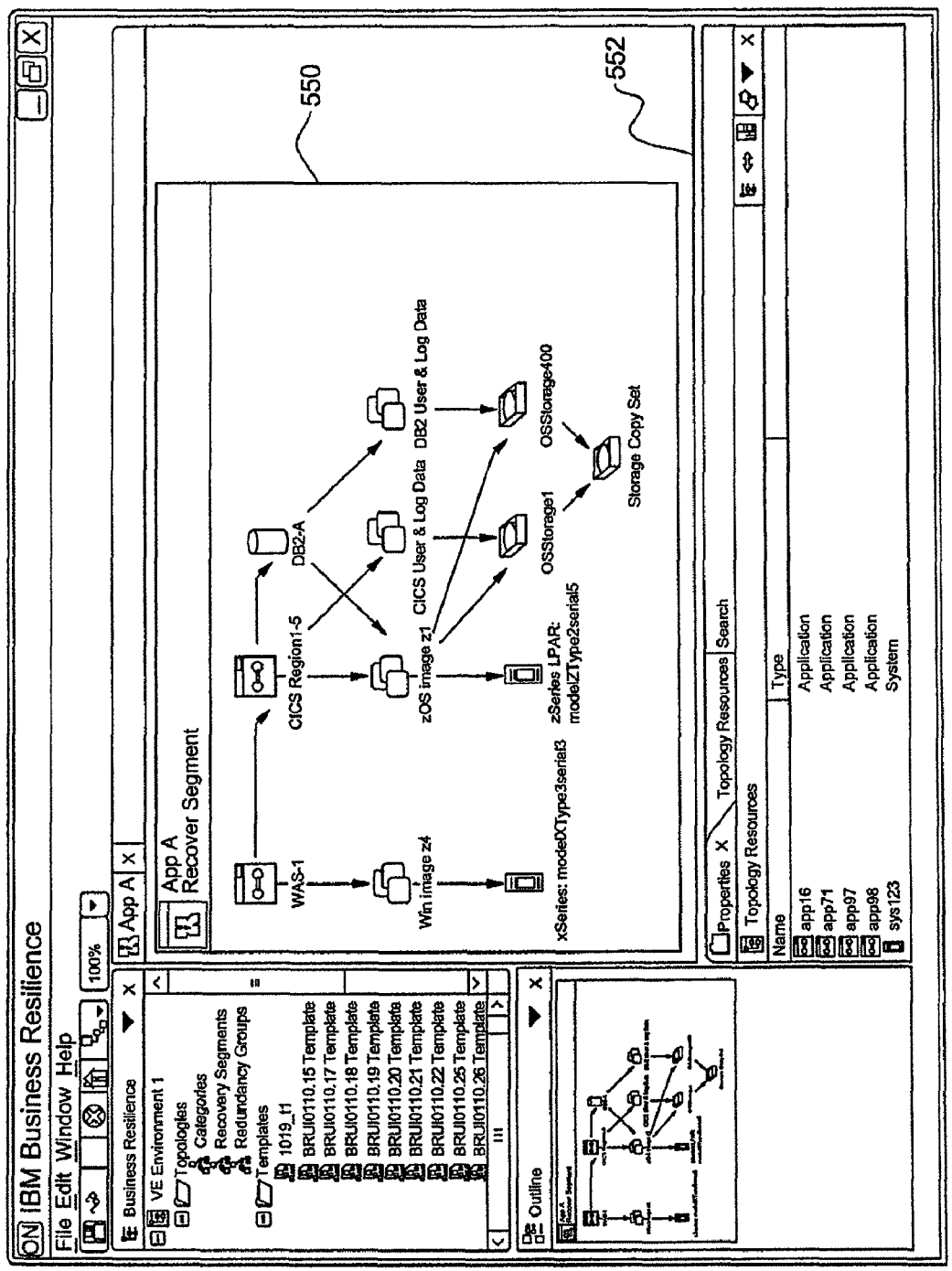
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins" that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
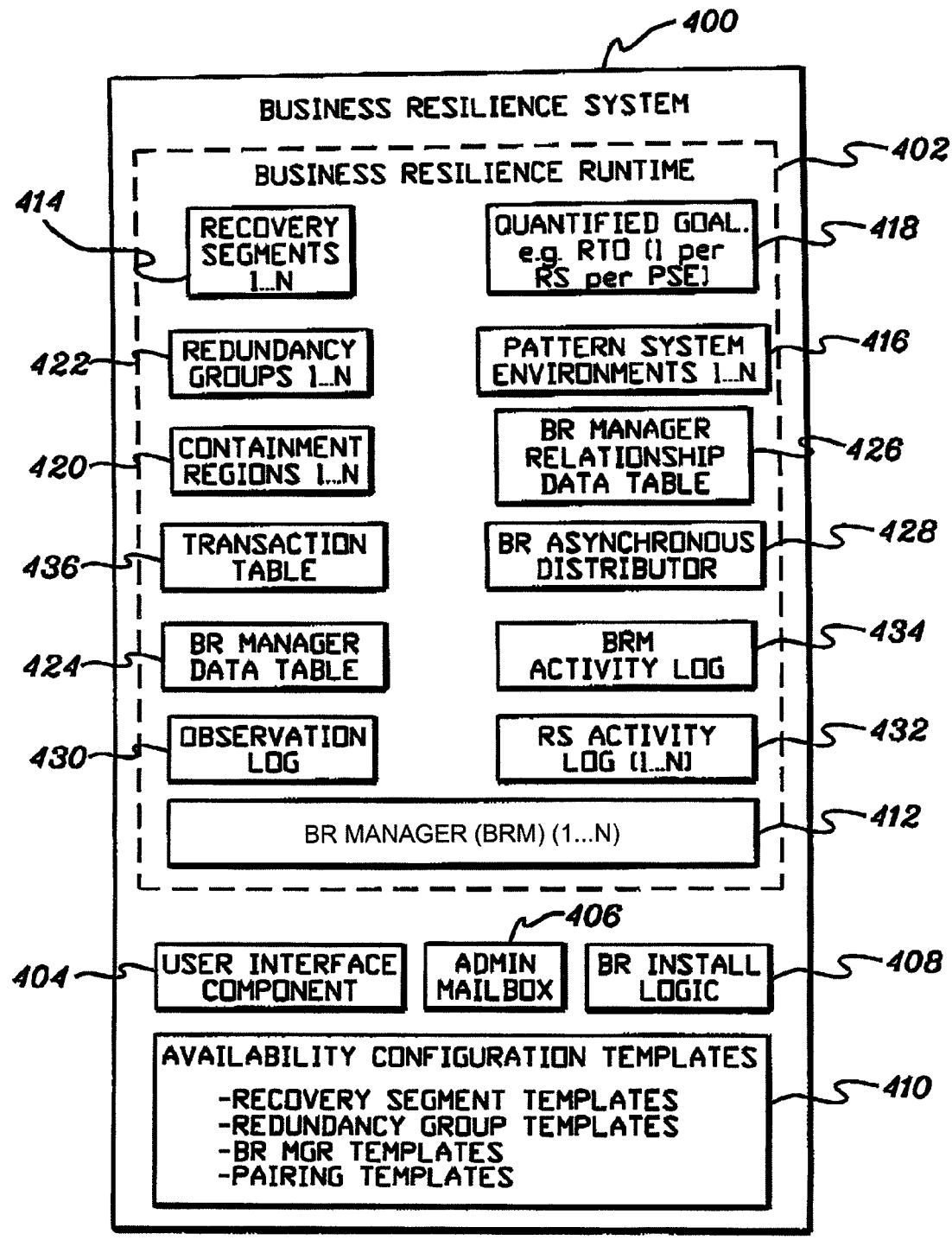
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
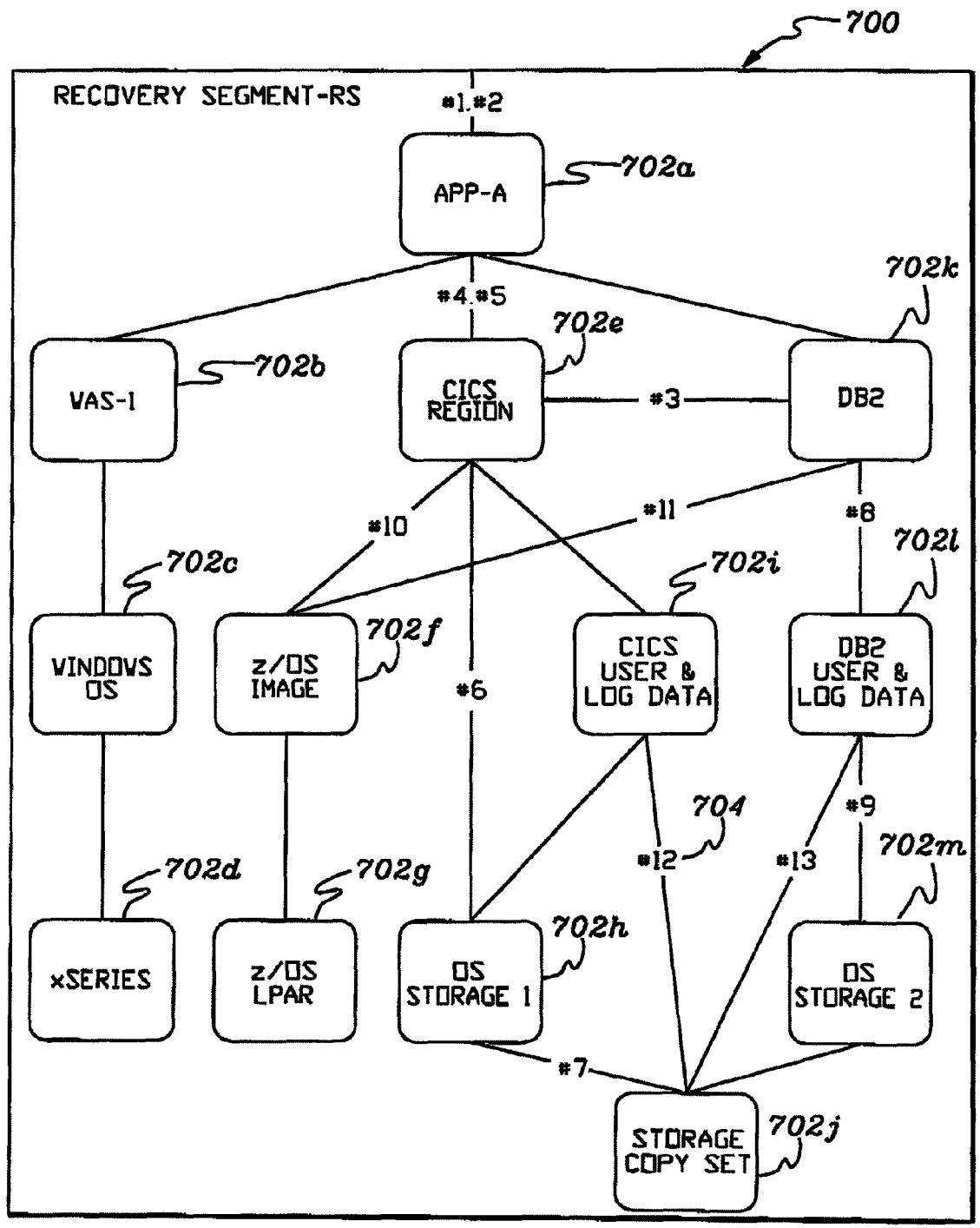
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |

-continued

| Rule | Resource #1 | State | Resource #2 | State |
|---|---|---|---|---|
| 13 | Storage Copy Set | Degraded | DB2 User & Log Data | Degraded |

The rules in the above table correspond to the numbers in the figure. For instance, #12 (704) corresponds to Rule 12 above.
Observation mode for the resources in the Recovery Segment has been initiated either by the customer or as a result of policy validation.
The environment has been prepared as a result of that goal policy via policy validation and the possible creation and execution of a preparatory workflow.
The goal policy has been activated for monitoring by BR.
As a result of these conditions leading up to runtime, the following subscriptions have already taken place:
The BRM has subscribed to runtime state change events for the RS.
RS has subscribed to state change events for the constituent resources.
These steps highlight one example of an error detection process:
The OSStorage-1 resource 702h fails (goes Unavailable).
RS gets notified of state change event.
$1^{st}$ level state aggregation determines:
  a Storage Copy Set→Degraded
  CICS User & Log Data→Degraded
  DB2→User & Log Data→Degraded
  DB2→Degraded
  CICS→Unavailable
  App-A→Unavailable
$1^{st}$ level state aggregation determines:
  a RS→Unavailable
BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
  RS definition from representation of IT Resources;
  Goal (RTO) and action policy specification, validation and activation; and
  Tooling by Eclipse, as an example, to integrate with IT process management.
Rapid, flexible, administrative level:
  Alteration of operation escalation rules;
  Customization of workflows for preparatory and recovery to customer goals;
  Customization of IT resource selection from RG based on quality of service (QoS);
  Alteration of definition of IT resource and business application state (available, degraded, or unavailable);
  Customization of aggregated state;
  Modification of topology for RS and RG definition;
  Selection of BR deployment configuration;
  Alteration of IT resource recovery metrics;
  Customization of generated Pattern System Environments; and
  Specification of statistical tolerances required for system environment formation or recovery metric usage.
Extensible framework for customer and vendor resources:
  IT resource definitions not specific to BR System; and
  Industry standard specification of workflows, using, for instance, BPEL standards.
Adaptive to configuration changes and optimization:
  IT resource lifecycle and relationships dynamically maintained;
  System event infrastructure utilized for linkage of IT resource and BR management;
  IT resource recovery metrics identified and collected;
  IT resource recovery metrics used in forming Pattern System Environments;
  Learned recovery process effectiveness applied to successive recovery events;
  System provided measurement of eventing infrastructure timing;
  Dynamic formation of time intervals for aggregation of related availability events to a root cause; and
  Distribution of achieved recovery time over constituent resources.
Incremental adoption and coexistence with other availability offerings:
  Potential conflict of multiple managers for a resource based on IT representation;
  Workflows for recovery and preparatory reflect operations with meta data linked to existing operations;
  Advisory mode execution for preparatory and recovery workflows; and
  Incremental inclusion of resources of multiple types.
Support for resource sharing:
  Overlapping and contained RS;
  Merger of CR across RS and escalation of failure scope; and
  Preparatory and recovery workflows built to stringency requirements over multiple RS.
Extensible formalization of best practices based on industry standards:
  Templates and patterns for RS and RG definition;
  Preparatory and recovery workflows (e.g., BPEL) for customization, adoption; and
  Industry standard workflow specifications enabling integration across customer and multiple vendors.
Integration of business resilience with normal runtime operations and IT process automation:
  Option to base on IT system wide, open industry standard representation of resources;
  BR infrastructure used for localized recovery within a system, cluster and across sites; and
  Utilization of common system infrastructure for events, resource discovery, workflow processing, visualization.

Management of the IT environment is adaptively performed, as described herein and in a U.S. patent application "Adaptive Business Resiliency Computer System for Information Technology Environments," (POU920070364US1), Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. patent applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described herein, in accordance with one or more aspects of the present invention.

Definition of a RS may use a representation of resources in a topology graph as described in "Use of Graphs in Managing Computing Environments," (POU920070112US1), Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113US1), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (POU920070114US1), Bobak et al., which is hereby incorporated herein by reference in its entirety.

Representations for the IT environment in which BR is to operate may be created from historical information captured during observation mode, as described in "Computer Pattern System Environment Supporting Business Resiliency," (POU920070107US1), Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (POU920070111US1), Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," (POU920070105US1), Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," (POU920070123US1), Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (POU920070117US1), Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," (POU920070120US1), Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121US1), Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (POU920070124US1), Bobak et al., which is hereby incorporated herein by reference in its entirety.

Formulation of a recovery plan is to uphold customer specification regarding the impact recovery operations can have between different business applications, as described in "Managing Execution Within a Computing Environment," (POU920070115US1), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

- Coordination for administrative task that employ multiple steps, as described in "Adaptive Computer Sequencing of Actions," (POU920070106US1), Bobak et al., which is hereby incorporated herein by reference in its entirety.
- Use of provided templates representing best practices in defining the BR system, as described in "Defining and Using Templates in Configuring Information Technology Environments," (POU920070109US1), Bobak et al., which is hereby incorporated herein by reference in its entirety.
- Use of provided templates in formulation of workflows, as described in "Using Templates in a Computing Environment," (POU920070126US1), Bobak et al., which is hereby incorporated herein by reference in its entirety.
- Making changes to the availability goals while supporting ongoing BR operation, as described in "Non-Disruptively Changing a Computing Environment," (POU920070122US1), Bobak et al., which is hereby incorporated herein by reference in its entirety.
- Making changes to the scope of a business application or Recovery Segment, as described in "Non-Disruptively Changing Scope of Computer Business Applications Based on Detected Changes in Topology," (POU920070125US1), Bobak et al., which is hereby incorporated herein by reference in its entirety.
- Detecting and recovery for the BR system is performed non-disruptively, as described in "Managing Processing of a Computing Environment During Failures of the Environment," (POU920070365US1), Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |

-continued

| Resource Type | Property | Value Range |
|---|---|---|
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |

| Resource Type | Property | Value Range |
|---|---|---|
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |

-continued

| Resource Type | Property | Value Range |
|---|---|---|
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
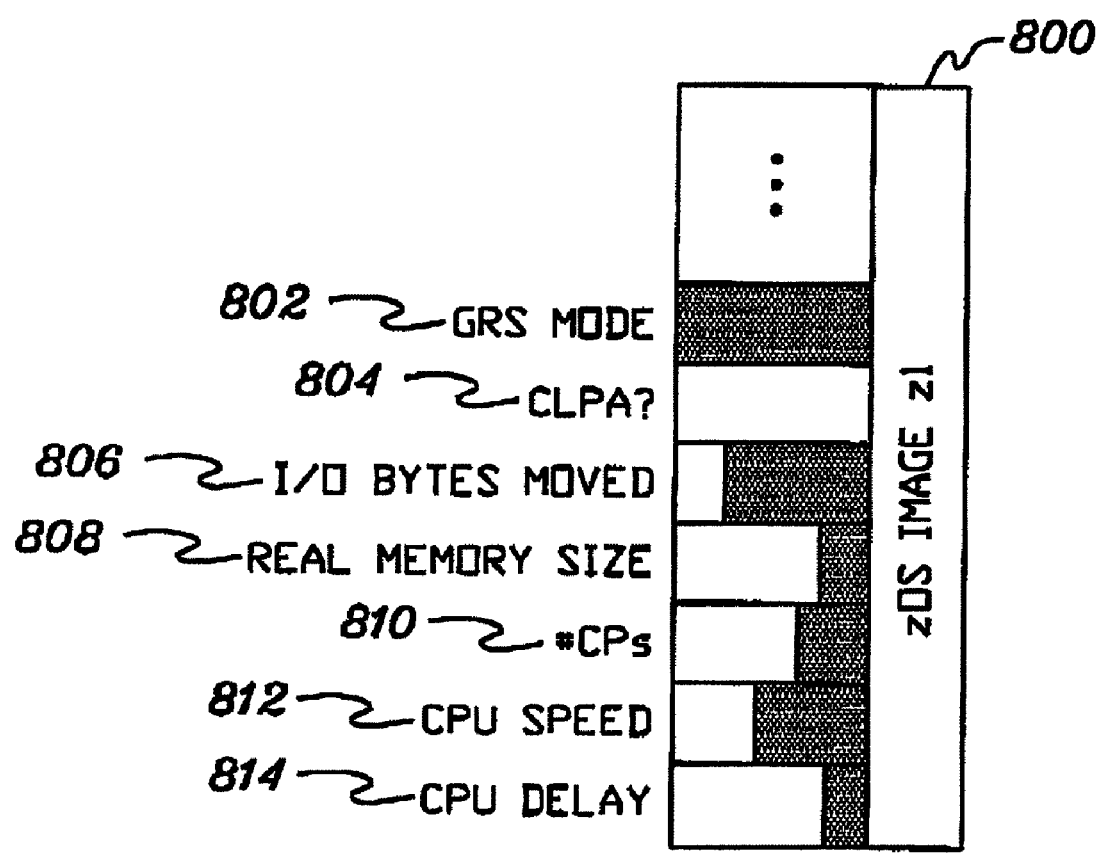
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
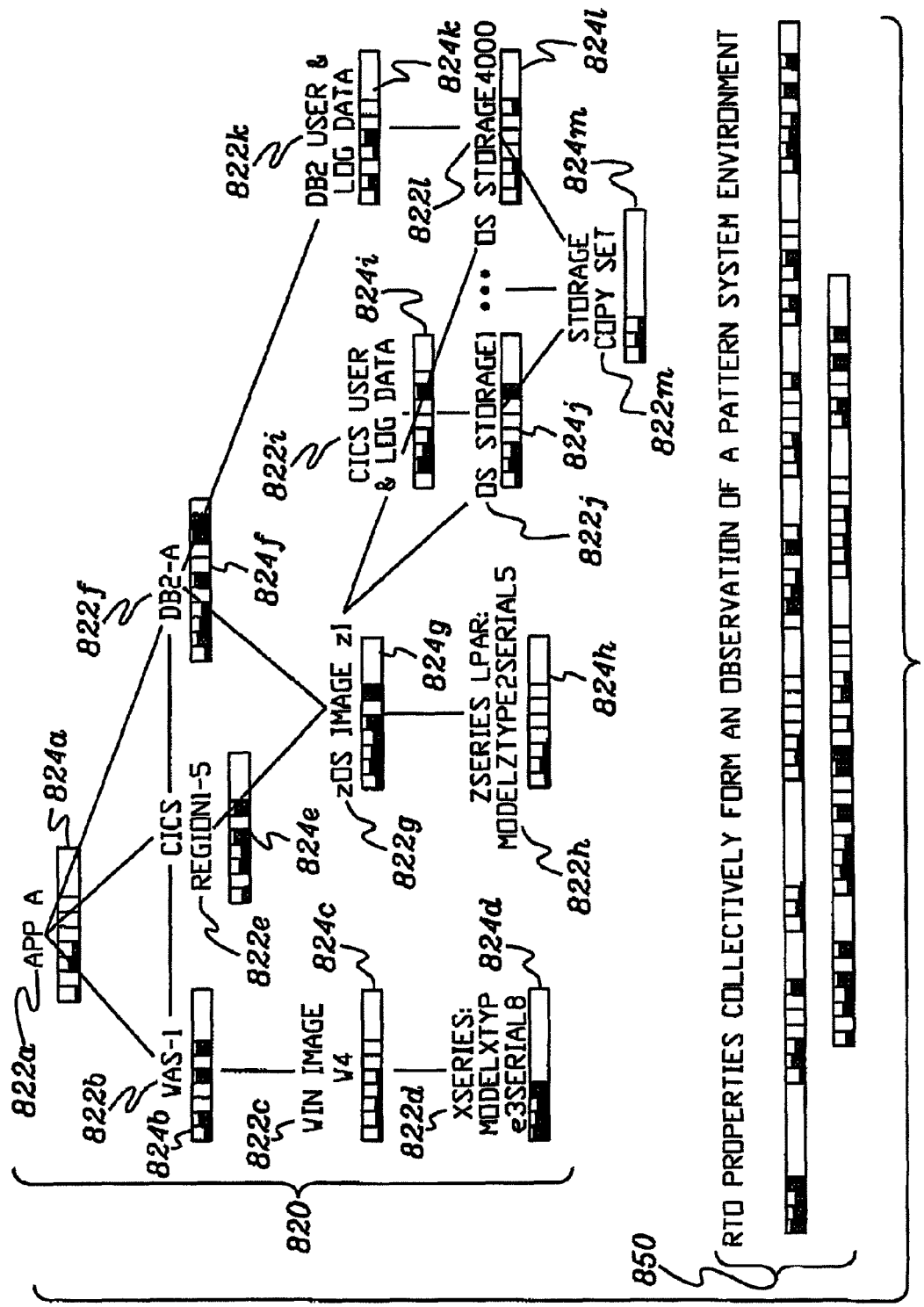
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

| Metric | Qualification |
| --- | --- |
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. | following is an example of values for the RTOGoalCapability metadata that is found in the BRMD entry for the resource that indicates this choice:

| | |
| --- | --- |
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are There is also a set of information about the resource that is employed—this information is provided as defaults in the BRMD entry for the resource, but provided to the BR team in the form of best practices information/defaults by the domain owners:

The operational state of the resource at which the observed recovery time interval started.

The operational state of the resource at which the observed recovery time interval ended.

The operational states of the resource at which point it can unblock dependent resources (example: operational states at which a DB2 could unblock new work from CICS, at which it could allow processing of logs for transactions ongoing at time of failure . . . ).

Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.
Are present to understand impacts on managed resources.
No decomposed RTO is associated with an assessed resource.
They are resources on which resources managed by BR depend upon, but are not directly acted on for availability by BR.
They are resources removed (or not explicitly added) from the actively monitored set of resources by the BR admin during RS definition.
They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.
The RS subscribes to state change notifications for assessed resources (and possibly other notifiable properties).
Relationships between observed and managed resources are possible (and likely).
BR monitors for lifecycle events on assessed resources in the same manner as for managed resources.
Assessed resources can be added and/or removed from Recovery Segments.
They can be used to contribute to the aggregated state of an RS.

Finally, there are a few restrictions that BR imposes upon assessed resources, in this embodiment:

Again, BR does not invoke any workflow operations on assessed resources.
A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).
To classify operations on resources into these PSEs for purposes of determining operation execution duration.
Help determine approximate path length of operations that are pushed down from BR to the resources, and possibly to the underlying instrumentation of each resource.
Help determine approximate path length of activities executed within BPEL workflows.
Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.
2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from of any of the BPEL workflows created by BR in the customer's environment. There is a standard template that each BR BPEL workflow uses. As part of that template, observation data is captured at the start of, during, and at the completion of each work flow. Specifically, in one example, one observation is created at the end of the workflow with data accumulated from completion of each activity. This information is used to gather timings for workflow execution for use in creating subsequent workflows at time of failure.

In accordance with an aspect of the present invention, a Recovery Segment is defined and employed to facilitate management of a customer's environment. Therefore, further details associated with a Recovery Segment are provided below.

A Recovery Segment is a logical grouping of resources that are associated with a business application, and the interrelationships between those resources. A RS is representative of the actual IT topology that exists in the specific customer deployment of the BR system. There can exist one or more Recovery Segments that are managed by the BR System. Each RS can include heterogeneous types of IT resources, including but not limited to: processors, operating systems, memory, storage, network, coupling/clustering technologies, databases, application containers, middleware, transaction systems, and applications. Each RS can include multiple instances of each type of resource. Recovery Segments are customer defined and controlled, with the BR system able to offer automated recommendations for such definition.

Recovery Segments are formalized runtime usable representations of the resources and relationships. The resources and relationships are expressed in a machine readable, machine editable manner.

Customers choose to define Recovery Segments through the BR System in order to associate a quantitative goal policy therewith, such as an availability goal. Recovery Segments can include single 'leaf' resources, compositions, resources across compositions, or a combination of the above. Recovery Segments can be coarse grained, such as representations of resources that constitute one or more applications, or fine grained, such as an individual database instance.

A RS instance and its constituent IT resources form a topology. In this example of a topology, the root is the Recovery Segment instance, the depth is one, and namely the leaves are the IT resources that are contained in the RS. It may also be true that the depth of a topology is large, with not only resources at leaf nodes, but also resources at intermediary nodes. Recovery Segments are managed by monitoring for changes in the resources, or interrelationships, including addition and deletion of relationships between constituent IT resources, and resource additions and deletions.

Recovery Segments can include other Recovery Segments (nesting).

Recovery Segments do not recreate the IT topology and relationships that exist, but rather the BR System represents portions of the topology relevant for each RS, recognizes changes in the topology, and associates the change with the effected Recovery Segment(s).

The resources contained can be both hardware and software resources—for example, customers may choose to define Recovery Segments on a collection of resources that represent an 'application' in the context of their environment. No specific application context is required or enforced by Recovery Segments, but they can be configured to correspond to application contexts used by other disciplines.

a Cycles in the Recovery Segment topology are flagged during definition and customer input is employed to handle any cycles.

Recovery Segments can share resources (overlapped RS), to accurately reflect customer's shared infrastructure supporting multiple business contexts.

A RS has a lifecycle and states associated therewith. In one example, the states are expressed in two categories:

Administrative States—reflecting the time period before the BR System begins monitoring the resources in a RS and managing availability. This period includes the actions of defining Recovery Segments, defining policies, and validating the environment for policy deployment.

Runtime States—reflecting the time period when a policy is activated for management of resources, monitored for failures, degradations and actions taken to restore the environment.

Figure 9:
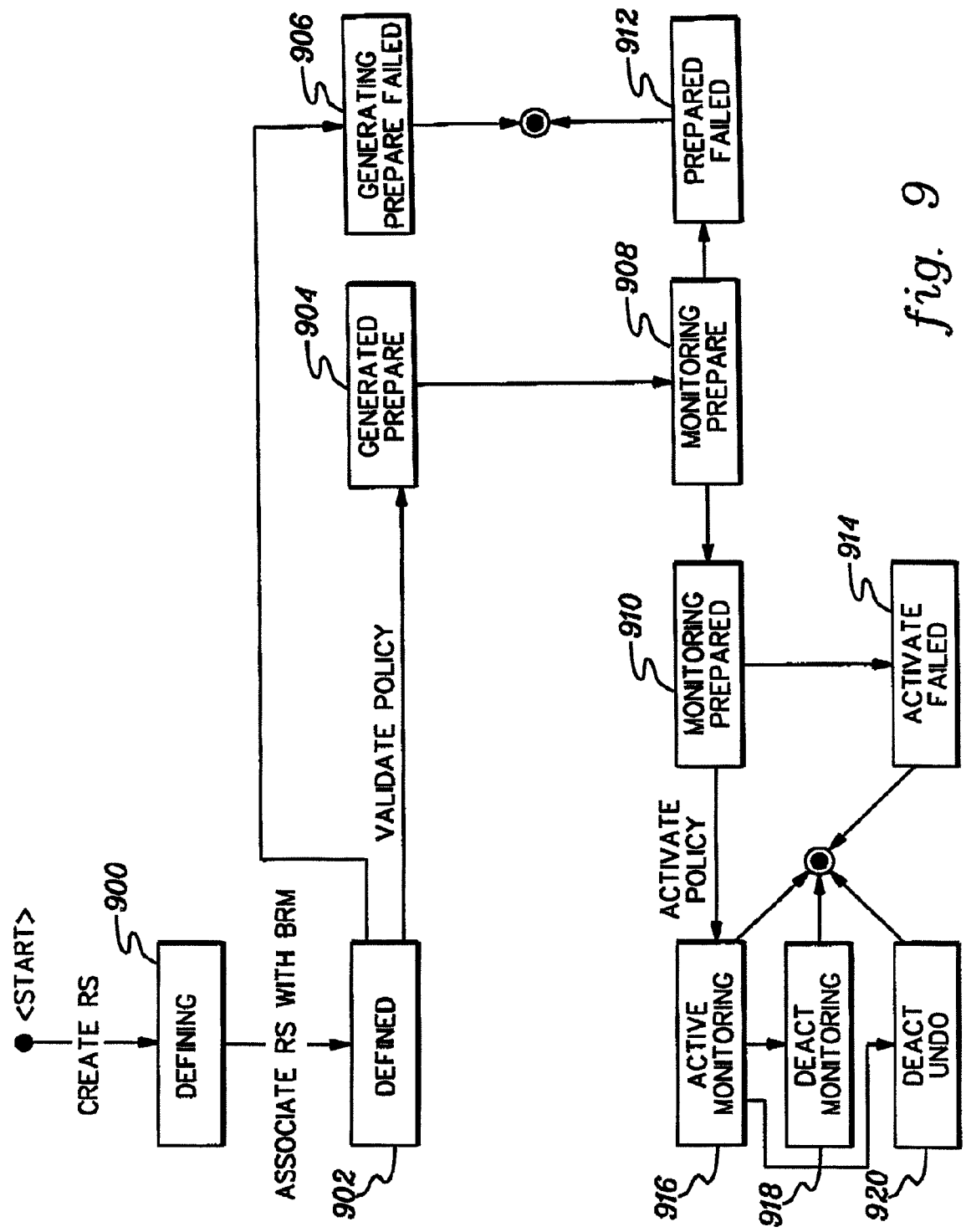
FIG. 9 illustrates one example of a diagram depicting various administrative states of a Recovery Segment, in accordance with an aspect of the present invention.

One example of a diagram depicting the various administrative states is shown in FIG. 9. As depicted, the states include, but are not limited to, Defining 900, Defined 902, Generated Prepare 904, Generating Prepare Failed 906, Monitoring Prepare 908, Monitoring Prepared 910, Prepared Failed 912, Activate Failed 914, Active Monitoring 916, Deact Monitor 918, and Deact Undo 920, each of which is described in the below table.

| State | Definition |
|---|---|
| Defining | This is the state in which a RS assumes at the start of the transaction used to create a new Recovery Segment instance from the BR User Interface component. During this transaction the RS instance is created and persisted, the topologies associated with the RS are persisted, relationships between the RS and the constituent resources are established, and finally the RS is associated with an existing BRM for monitoring, and deployed. |
| Defined | If the transaction used to define the RS is successful, per the defining steps listed above, then the state of the RS transitions to Defined. No policy has been prepared or activated yet for management, but numerous policies can now be defined at this stage. Also observation mode can be enabled for the RS. |

-continued

| State | Definition |
|---|---|
| Generated Prepare | A policy prepare workflow has been successfully generated and is ready for execution in the BPEL engine. |
| Generating Prepare Failed | A policy prepare workflow was not successfully generated. |
| Monitoring Prepare | A policy prepare workflow has been initiated for execution to the BPEL workflow engine and is in progress; the state of the resources in the Recovery Segment, and the configurations of those resources are being altered to support the policy specification. |
| Monitoring Prepared | The policy prepare workflow has successfully completed (successful completion code from the workflow from the BPEL workflow engine). |
| Prepared Failed | The policy prepare workflow has completed unsuccessfully, compensation action is to occur to roll back to previous policy or require human intervention. |
| Activate Failed | The RS is unsuccessfully activated, so options exist for either rolling back to the previous policy, or for manual intervention; the resource(s) on which the activate failed, and options that exist, given execution of past policy, are to be presented to the user for assessment and decision. |
| Active Monitoring | The policy has been successfully validated and the environment prepared and is now ready for active monitoring by the RS. The runtime state of the RS transitions to Active Monitoring. If the Observation Mode is not activated, it will be set at this time. |
| Deact Monitoring | This state indicates a human decision to stop the active management of the currently active policy. Nothing is done with the prepared environment that supported this policy, i.e. the prepared environment is not disassembled. In addition, if the RS is a participant in a containment region (CR) that is not in a 'handled' state, the deactivate serializes on the CRs transition to a 'handled' state. |
| Deact Undo | This state indicates a human decision to stop the active management of the currently active policy, and to undo the prepared environment that supported the policy. In addition, if the RS is a participant in a containment region (CR) that is not in a 'handled' state, the deactivate serializes on the CRs transition to a 'handled' state. |
| Failed | RS instance has failed |

One example of a RS Administrative States Transition Table depicting state transitions is provided below:

| From State | To State | Event Triggering | Operation to Evaluate |
|---|---|---|---|
| Defining | Defined | Human interaction with the BR User Interface Component | |
| Defined | Generated Prepare | Human interaction with the BR User Interface Component | Validation of Policy, prepare workflow generated |
| Defined | Generating Prepare Failed | Human interaction with the BR User Interface Component | Validation of Policy failed to generate a prepare workflow |
| Generated Prepare | Monitoring Prepare | Human interaction with the BR User Interface Component for the policy prepare workflow to be submitted for execution with the BPEL workflow engine. | Preparing IT Configuration for Availability |
| Monitoring Prepare | Monitoring Prepared | Successful completion of preparatory workflow from BPEL engine | Monitoring Workflows and System for availability |
| Monitoring Prepare | Prepared Failed | Unsuccessful completion of preparatory workflow from BPEL engine | Monitoring Workflows and System for availability |
| Monitoring Prepared | Active Monitoring | Human interaction with the BR User Interface Component | Activate Policy |
| Monitoring Prepared | Activate Failed | Policy activation failed | |
| Active Monitoring | Deact Monitoring | Human interaction from BR User Interface Component | Deactivate RS monitoring, do not undo prepared environment |

-continued

| From State | To State | Event Triggering | Operation to Evaluate |
|---|---|---|---|
| Active Monitoring | Deact Undo | Human interaction from BR User Interface Component | Deactivate RS monitoring and undo prepared environment |
| Any of the Admin states | Failed | Internal failure of Recovery Segment logic. In this case the RS logic knows it is going to fail and sets the AdminState to Failed, and emits a state change event. There are other failure scenarios where the RS will fail but will not be able or allowed to emit a state change event. | |

One example of Runtime State definitions is provided below:

| State | Definition |
|---|---|
| Active Monitoring | When the Admin state transitions to "Active Monitoring" the Runtime state is also transitioned to Active Monitoring. Once activated, the RS goes into this state while evaluation of the constituent resource states is done to determine the aggregate state of the RS. |
| Available | The RS Aggregated state rules for 'available' state have been met for this RS. |
| Degraded | The RS Aggregated state rules for 'degraded' state have been met for this RS. |
| Unavailable | The RS Aggregated state rules for 'unavailable' state have been met for this RS. |
| Recovering | One or more IT resources being monitored has had a change in attribute value that is relevant to the state of the RS, based on aggregated state rules; a recovery is being evaluated |
| Recovery Failed | The RS is not able to be recovered after repeated attempts, and is placed in a Recovery Failed state. Human intervention is used to transition the RS to a different state. |
| Failed | RS instance has failed |

Figure 10:
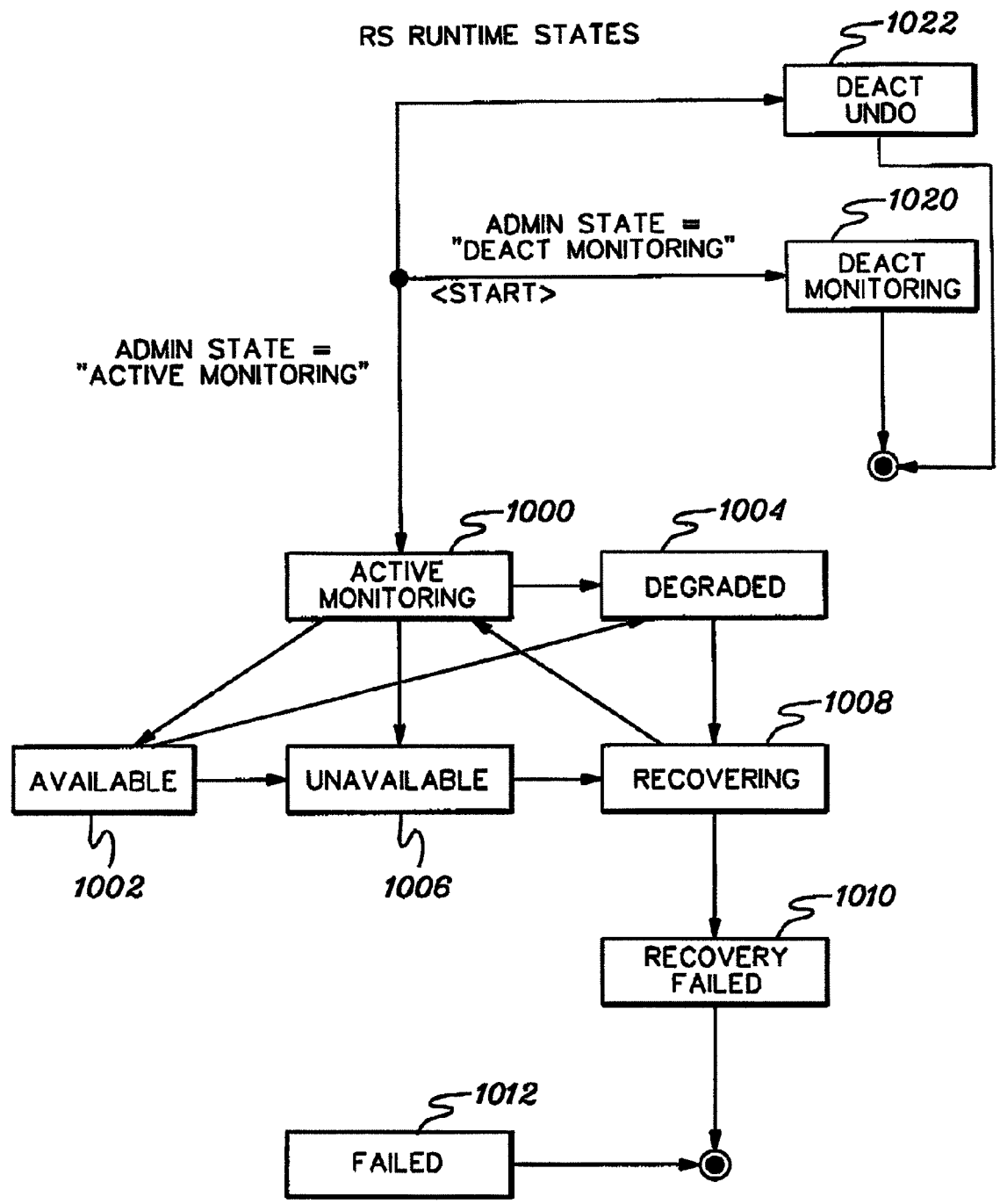
FIG. 10 illustrates one example of a diagram depicting various runtime states of a Recovery Segment, in accordance with an aspect of the present invention.

A diagram depicting these states is shown in FIG. 10. For example, the diagram includes the following states: Active Monitoring 1000, Available 1002, Degraded 1004, Unavailable 1006, Recovering 1008, Recovery Failed 1010 and Failed 1012. It also depicts a Deact Monitoring state 1020 entered into when the admin state transitions to Deact Monitoring, and a Deact Undo state 1022 entered into when the admin state transitions to Deact Undo.

One example of a Runtime State Transition Table depicting state transitions is provided below. In the following table, where the 'Event Triggering' column references one or more attributes associated with the RS, these include one or more of: attributes and values of the resource, the resource's operational state, or the current Pattern System Environment (PSE), as examples.

| From State | To State | Event Triggering | Operation to Evaluate |
|---|---|---|---|
| Active Monitoring | Available | Match of customer configured RS Aggregation State rules for 'available' state with current values of resource attributes. | State Aggregation for RS |
| Active Monitoring | Degraded | Match of customer configured RS Aggregation State rules for 'degraded' state with current values of resource attributes. | State Aggregation for RS |
| Active Monitoring | Unavailable | Match of customer configured RS Aggregation State rules for 'unavailable' state with current values of resource attributes. | State Aggregation for RS |
| Available | Degraded | BR System has detected a change in value for one or more attributes associated with this RS. | BR System Monitoring function |

-continued

| From State | To State | Event Triggering | Operation to Evaluate |
|---|---|---|---|
| Available | Unavailable | BR System has detected a change in value for one or more attributes associated with this RS. | BR System Monitoring function |
| Degraded | Recovering | Nonpurposeful degradation: BR System has detected a change in value for one or more attributes associated with this RS. | BR System Monitoring function |
| Unavailable | Recovering | Nonpurposeful unavailable; BR System has detected a change in value for one or more attributes associated with this RS. | BR System Monitoring function. |
| Recovering | Active Monitoring | Successful completion of formulation, successful invocation recovery workflow. | BR recovery workflow formulation; recovery initiation |
| Recovering | Recovery Failed | Completion code from RS indicates Recovery Failed. | |
| Any of the runtime states | Deact Monitoring | Human intervention via BR User Interface Component. | Deactivate RS monitoring, do not undo prepared environment |
| Any of the runtime states | Deact Undo | Human intervention via BR User Interface Component. | Deactivate RS monitoring, and undo the prepared environment associated with the currently active policy |
| Any of the runtime states | Failed | Internal failure of Recovery Segment logic, unrecoverable failure resulting from failure of restart logic for RS | |

Recovery Segment Operations

The following table lists examples of various Recovery Segment operations and functions:

| Operation | Description |
|---|---|
| DefinePolicy( ) | Associate a quantified BR System goal policy (e.g., availability) with the Recovery Segment; for example, a RTO goal. |
| ValidatePolicy( ) | After a goal policy is associated with a Recovery Segment, the policy will be validated and decomposed to the constituent IT resources in the RS |
| PreparePolicy( ) | Input is specific policy, and the prepare workflow associated with that policy is submitted for execution to the BPEL compliant workflow engine. |
| ActivatePolicy( ) | For this RS, the input policy is made active for management by the BR System, using the input mode specified. Until the ActivatePolicy( ) has successfully completed, no runtime management of the environment is initiated. |
| DeactivateMonitoring( ) | For this RS, deactivate the runtime management of the currently active policy. |
| DeactivateUndo( ) | Deactivate and undo the prepared workflow for this RS. |
| DeactivateDestroy( ) | Deactivate and destroy this RS. |
| StartObservationMode( ) | Start observation mode for this RS. |
| StopObservationMode( ) | Stop observation mode for this RS. |
| ChangePeriodicPollInterval( ) | Change the periodic poll interval for this RS. |
| DefineAggregatedState( ) | Define the aggregated state for this RS. |
| ChangeAggregatedState( ) | Alter the aggregated state for this RS. |
| ModifyRecoveryTimeline( ) | Alter the recovery timeline for this RS. |
| ChangePSE( ) | Change to a different PSE for this RS. |
| DefineSubsetRS( ) | Megaflow: Add a subset RS to a Superset RS. |
| SwitchPolicy( ) | Megaflow: Dynamically change the policy (with some restrictions). |

| Operation | Description |
| --- | --- |
| AddResources( ) | Megaflow: Change RS scope by adding resources to this RS. |
| DeleteResources( ) | Megaflow: Change RS scope by deleting resources from this RS. |

Figure 11:
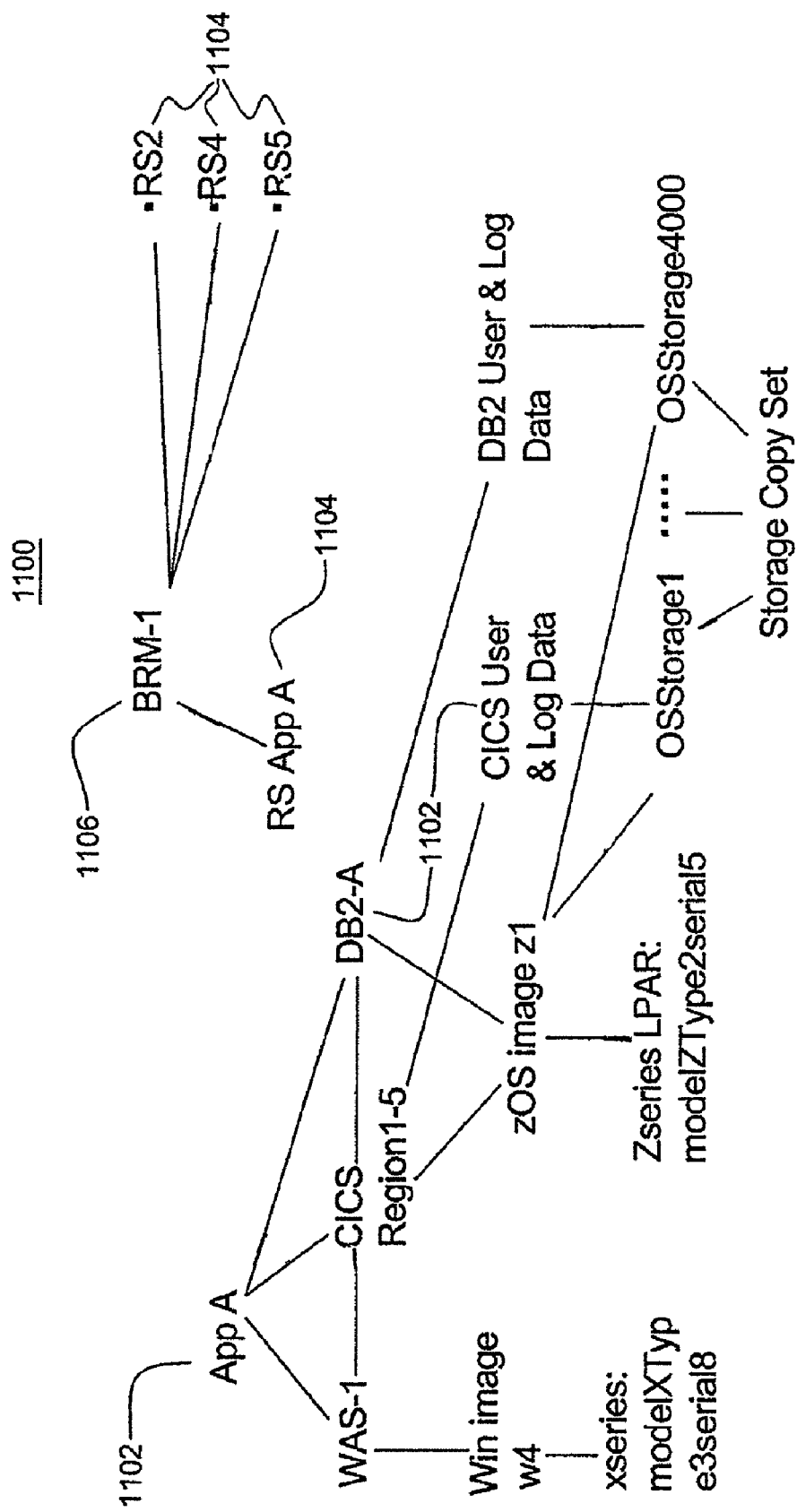
FIG. 11 depicts one example of a Recovery Segment using a specific IT resource configuration, in accordance with an aspect of the present invention.

One example of a RS, using a specific IT resource configuration, is depicted in FIG. 11. As shown a Recovery Segment 1100 includes example resources 1102 that may be part of a RS, but the RS is not limited to these resources. Also, the example shows that in a BR System, multiple RSs 1104 may be managed by a single BRM 1106.

Figure 12:
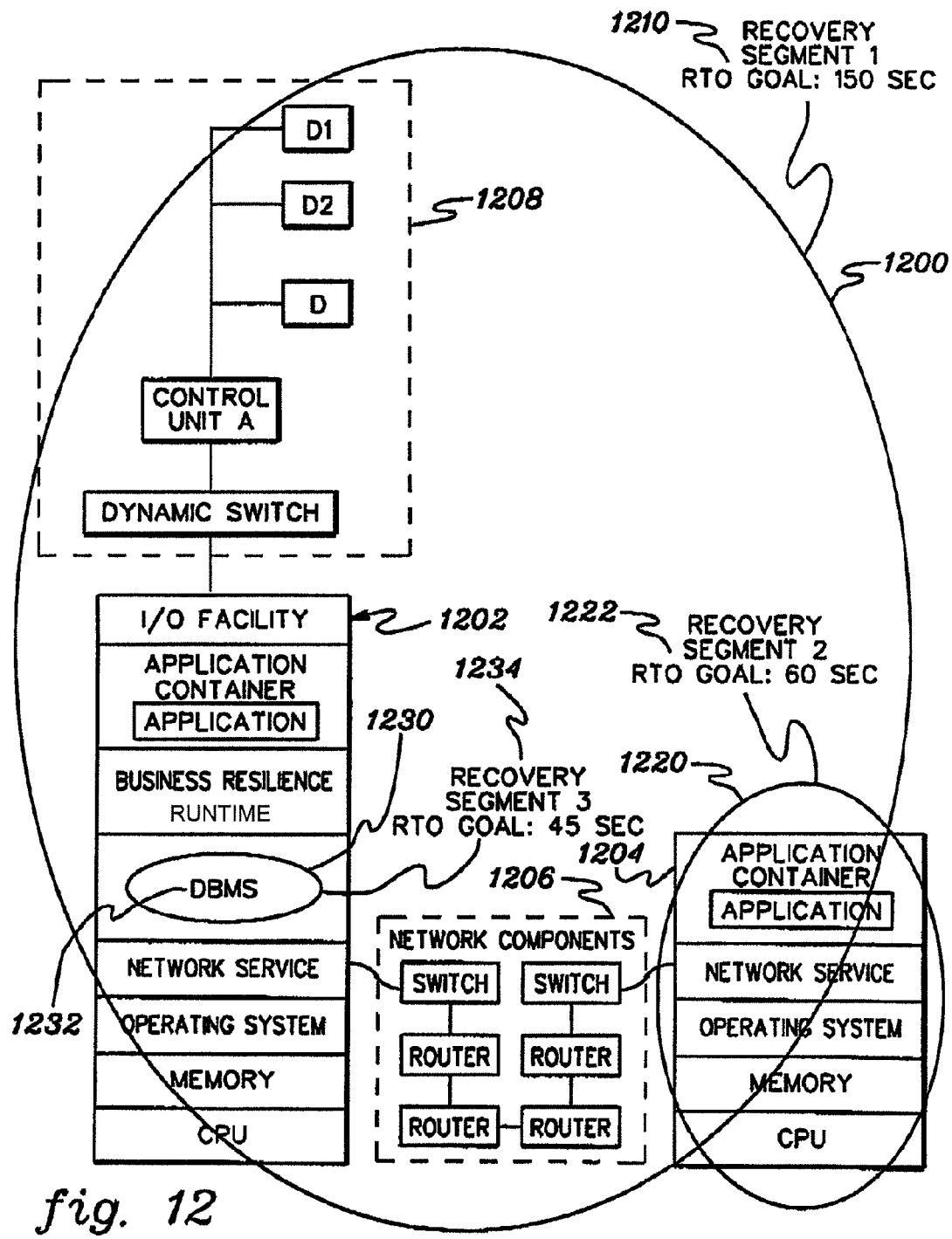
FIG. 12 depicts one example of a Recovery Segment, in accordance with an aspect of the present invention.

Another example of a RS is depicted in FIG. 12. As shown, Recovery Segment 1 (1200) is an example of a superset Recovery Segment including multiple CPCs 1202, 1204, a connecting network 1206, as well as an I/O subsystem 1208. Recovery Segment 1 may have an associated quantified availability goal within the BR System, such as one that specifies RTO (1210).

Recovery Segment 2 (1220) is a subset Recovery Segment encompassing one of the application CPCs 1204, and in this example of using RTO goals, this Recovery Segment has a separate RTO goal 1222.

Recovery Segment 3 (1230) is a subset Recovery Segment that represents just a DBMS 1232 of CPC 1202, and in this example of using RTO goals, this Recovery Segment has a separate RTO goal 1234.

Creating an RS

One embodiment of the logic for creating a Recovery Segment is described with reference to FIGS. 13A-13C. As an example, this logic is invoked and controlled by the UI component of the BR System, and supported by cooperative processing between the UI and BRM components. For instance, a set of commonly accessible tables is defined that have vendor provided templates and pairings. These tables are updatable by customers, and are accessible from the BR System Install Logic, the User Interface Component, as well as by any of the BRMs during the processing, including RS definition.

In one example, the process for creating a new RS starts with the customer viewing the IT topology, STEP 1300. In the BR System, the User Interface component provides visualization of the IT resources and relationships in a customer environment. The relationship and resource information can come from retrieving data about the IT configuration from a number of sources, such as well known inventory products, customer developed inventories, or a standards based repository, like a Configuration Management Database (CMDB) (see, e.g., "Foundations of IT Service Management: based on ITIL," Jan Van Bon, Van Haren Publishing, Sep. 15, 2005, ISBN 9077212582, hereby incorporated herein by reference). The viewing technology used can be based on any visualization capability that represents resources and their relationships, and in the implementation chosen by the BR System, the visualization mechanism is based on an Eclipse framework, as one example.

Next, there are a number of alternate flows to obtain a proposed set of resources and their interrelationships for the new RS; including, for instance, customer specifies one seed, customer specifies more than one seed, or customer uses RS definition templates. In this particular flow, the customer specifies one seed. Thus, the customer selects a specific resource to use as a seed for determining the resource nodes which will be part of the RS, STEP 1302. This seed resource is used by the BR System to perform a Depth First Search (DFS) and generate a DAG as the proposed RS, STEP 1304. DFS is a well known technique for graph traversal in the area of computer science, and is described in the following example references: Lau, Hang T., A Java Library of Graph Algorithms and Optimization (Discrete Mathematics and Its Applications, ISBN 1584887184, 2006, Chapman & Hall; and Evans, James, Optimization Algorithms for Networks and Graphs, Second Edition, ISBN 0824786025, 1992, CRC, each of which is incorporated herein by reference in its entirety.

Subsequent to including the proposed resources and their interrelationships in a DAG, the customer has an option of modifying the recommendation, INQUIRY 1306. If modifications are desired, any alterations are accepted by the User Interface component. The customer can iteratively modify the proposed RS resources at this point, through adding and/or deleting resources and their relationships, STEP 1308. Any resources deleted, in this example, are maintained by BR as assessed resources.

Thereafter, the customer can choose to use, INQUIRY 1310, and apply pairing templates, STEP 1312, if so chosen. These templates indicate best practices about relationships among resources (e.g., DB2 depends on a log, the log depends on a catalog, etc.). The pairing can be indicated by the deliverer of the resources, by the customer, etc.

After the templates are applied, the resulting proposed pairing specification can potentially be different than what has already been configured by the customer. In order to verify that there are no conflicts, the DAG is traversed and any pairing that has an existing BRRD entry is inspected, STEP 1314. The existing specification and proposed specification for the pairing are compared, and if any differences exist, there is a conflict. For example, DB2 depends on a catalog, and the catalog depends on storage, but storage is not part of RS, so a conflict. A decision is made as to whether pairing conflicts are found, INQUIRY 1316. If there are, then the customer returns to INQUIRY 1310 to apply different templates and iterate until there are no conflicts.

When there are no pairing conflicts, the next step is to select a BRM to manage this RS, STEP 1318, as described further below. After the BRM that will manage the new RS is determined, the BR System monitors for any changes in relationships between resource nodes in the DAG(s) associated with the new RS, STEP 1320. The monitoring can be initiated via use of any monitoring product, through interrogation of resource specific interfaces such as that provided by operating systems, databases and middleware, or through the use of a standards based monitoring, such as one built on the Common Information Model (CIM) standard from the Distributed Management Task Force (DMTF) (see, e.g., http://www.dmtf.org/home).

In the next set of steps, the entries with which to update the BRMD and BRRD are determined. In order to accomplish this, the first node of each DAG associated with the new RS is selected, and a DFS is initiated for each DAG of the RS, STEP 1322 (FIG. 13B). For each DAG, a determination is made as to whether the processing has completed for all of the resource nodes in the DAG, INQUIRY 1324. If so, the processing continues to associate the RS with the selected BRM, as described below, STEP 1336.

If all the nodes of all the DAGs for the RS have not been traversed yet, the progression moves from node to node using a DFS on each DAG. At each resource node, the determination is made as to whether the resource node already has an entry in the BRMD, INQUIRY 1326. If not, the resource node is saved in a list with which the BRMD will be appended, STEP 1328. If the resource exists in the BRMD, the processing evaluates the relationship between the resource node and other nodes, and whether the relationship exists already in the BRRD, INQUIRY 1330. If not, the link or relationship information is saved in a list with which the BRRD will be appended, STEP 1332, and the traversal is advanced to the next node in the DFS, STEP 1334. If the relationship exists in the BRRD already, the traversal is advanced to the next node in the DFS, STEP 1334.

Thereafter, the RS is associated with the BRM selected to manage it, STEP 1336, as is further described below. After the RS is associated with the selected BRM, the DAG(s) for the new RS are saved in a topology table, persisted as part of the RS set of tables, STEP 1338 (FIG. 13C). For each entry in the BRMD list to update, an insert into the BRMD is performed for the resource nodes, STEP 1340. For each entry in the BRRD list to update, an insert into the BRRD is performed for the relationships that are the links between the nodes in the DAGs associated with the new RS, STEP 1342. Lastly, the RS Activity Log is updated, STEP 1344.

In the above description, updates to the BRMD and BRRD include updating a list and then inserting the list into the database. As a further example, the BRMD and/or BRRD can be directly updated without first creating the list. Other variations are also possible.

As described above, during creation of the RS, a BRM is selected. A BRM is selected by one of three techniques, as examples: 1) if the RS being defined has overlapping topology with another RS with an already defined RS, then the same BRM is selected; 2) a set of defined and active BRMs is displayed and the customer selects one to associate with the RS; 3) customer decides to create a new instance of a BRM, and associate that one with the RS. One embodiment of the logic for selecting the BRM is described with reference to FIG. 14. In one example, this logic is invoked and controlled via the UI component of the BR system, and supported by cooperative processing between the UI and BRM components.

Figure 14:
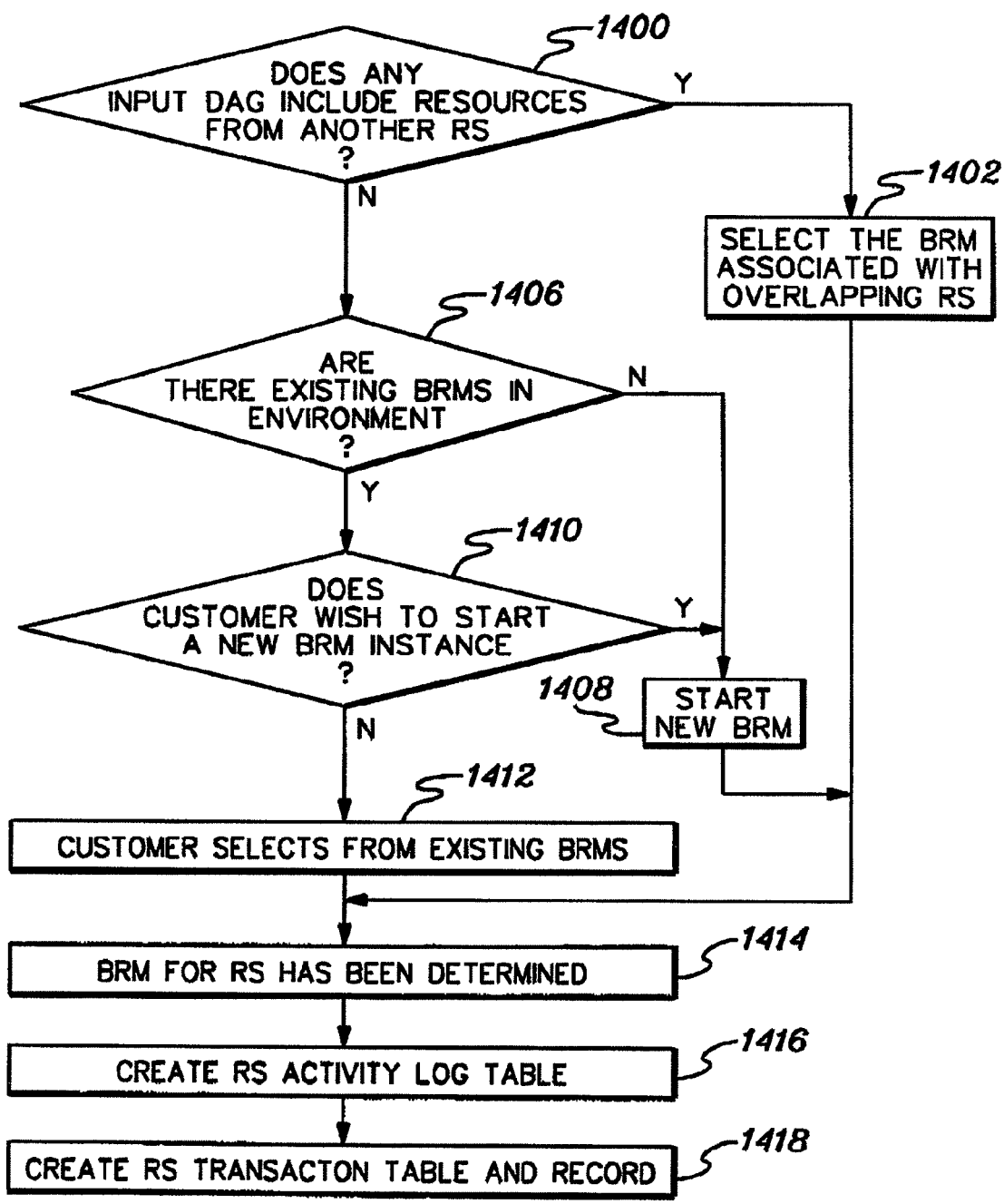
FIG. 14 depicts one embodiment of the logic for selecting a Business Resilience Manager in creating the Recovery Segment, in accordance with an aspect of the present invention.

Referring to FIG. 14, initially, a determination is made as to whether the proposed DAG includes any resource nodes from another already defined RS, INQUIRY 1400. A superset RS is to be defined before any subset RS, therefore, a superset RS includes the resources within any subset RS, as well as resources that are only in the superset. If there are nodes in the DAG that are resources which exist in an already defined RS, then the BRM that manages the already defined RS will also manage the RS being created, STEP 1402. The reason for selecting the same BRM for any overlapping RS is that the scope of outage can easily span to related resource sets, and a given BRM is to be able to handle a resource failure assessment without consultation across multiple BRMs during a failure situation If the input DAG does not include resources from another RS, a further determination is made as to whether there are any existing, active BRMs in the customer environment, INQUIRY 1406. If not, a new BRM instance is started to manage the new RS, STEP 1408. The start can be performed through specific interfaces that are defined for program starts, depending on the environment. In one example, the start can be via a JMX request, as well known in the art, or via mbeans (see, e.g., Kreger et al., Javar™ and JMX: Building Manageable Systems, ISBN 0672324086, 2002, Addison-Wesley Professional or JSR-255 at http://jcp.org/en/jsr/detail?id=255, each of which is hereby incorporated herein by reference in its entirety). In starting the BRM, the server, operating system and hosting containers for the new BRM can be explicitly specified, or it can be based on the automated recommendations from best practice BRM deployment templates.

If there are existing BRM instances, INQUIRY 1406, a determination is made as to whether the customer wants to start a new BRM to manage the new RS any way, INQUIRY 1410. If the customer decides to start a new BRM instance, STEP 1408 is executed. If a new BRM is not started to manage the new RS, the customer selects from among the existing BRMs, STEP 1412.

After a BRM is selected or started, the flow transitions to STEP 1414, which indicates that a BRM for the RS has been determined.

Next, a RS activity log table is created, STEP 1416, and a RS Transaction Table and record are created for use in serialization of the BR System components, STEP 1418. This concludes processing of selecting a BRM for this RS.

In addition to the above, the RS is associated with the BRM. One embodiment of the logic for this association is described with reference to FIG. 15. In one example, the BRM component of the BR System executes this logic, unless otherwise noted.

Figure 15:
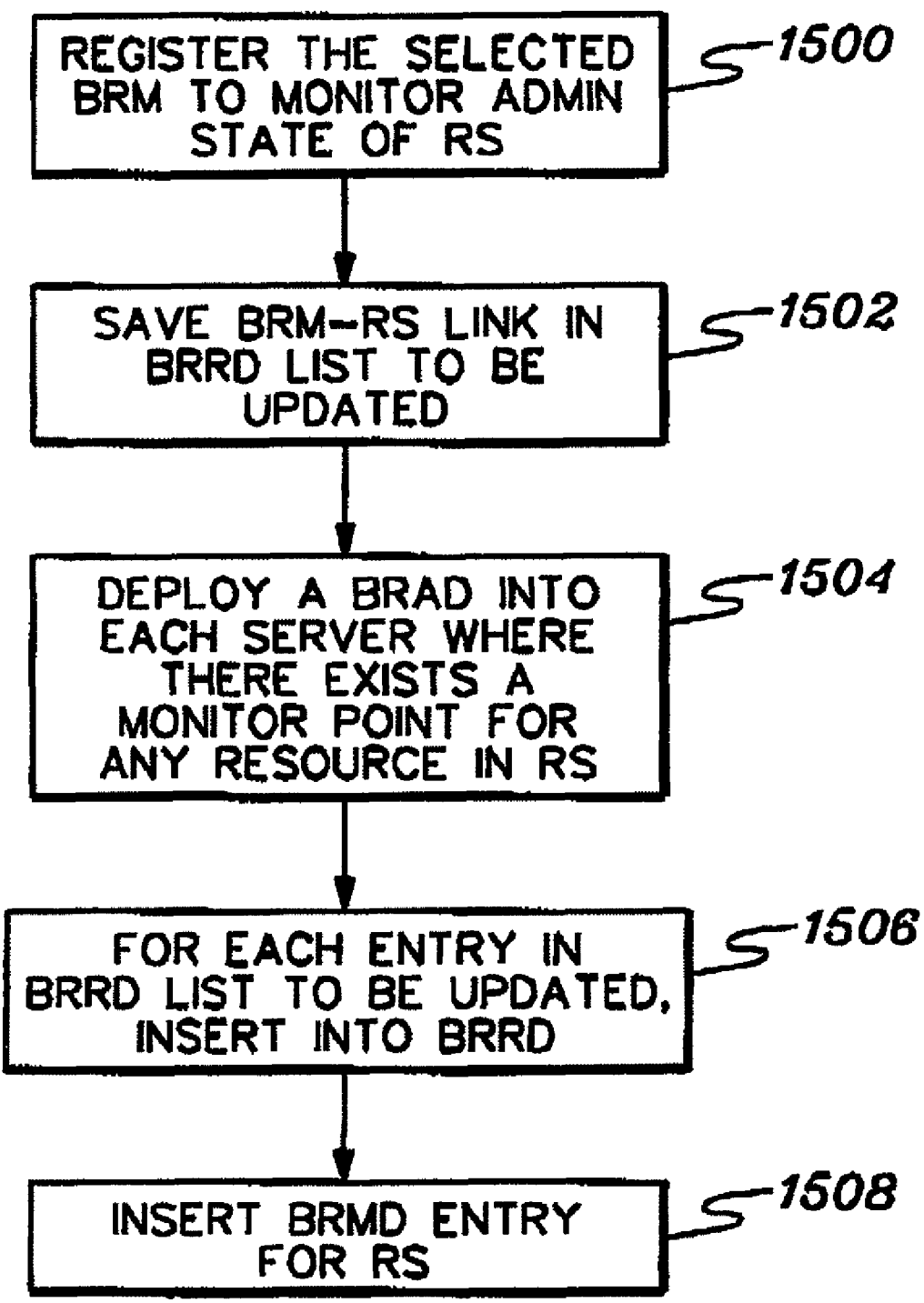
FIG. 15 depicts one embodiment of the logic for associating the Recovery Segment with the Business Resilience Manager, in accordance with an aspect of the present invention.

Referring to FIG. 15, the selected BRM is registered to monitor the administrative state of the RS, STEP 1500. The registration can be performed using any of a number of interfaces well known in the art. For example, a subscribe to a publish from a message queuing product can be used, as well as a SNMP or CIM event published by a management agent for the resource, interfaces provided by any of the commercially available monitoring products, or a piece of code on a z/OS operating system that acts as a MEMTERM resource manager, a message processing routine, an ENF event listener, or a SSI registered exit.

Then, the BRM-RS relationship is saved in a list of BRRD entries to be updated, STEP 1502. Further, it is ensured that the mechanism for retrieving resource data is operational, STEP 1504. In one implementation, that can be a BRAD; in another implementation, the mechanism can be a resource agent. Then, for each entry in the saved list of BRRD entries to be updated, database inserts are performed to update the BRRD table, STEP 1506. Further, an entry for the RS itself is created in the BRMD, STEP 1508. This concludes the association.

Described in detail above is one example of creating a RS when one seed is specified. The following description shows the creation of a RS when more than one seed is specified.

Figure 13A:
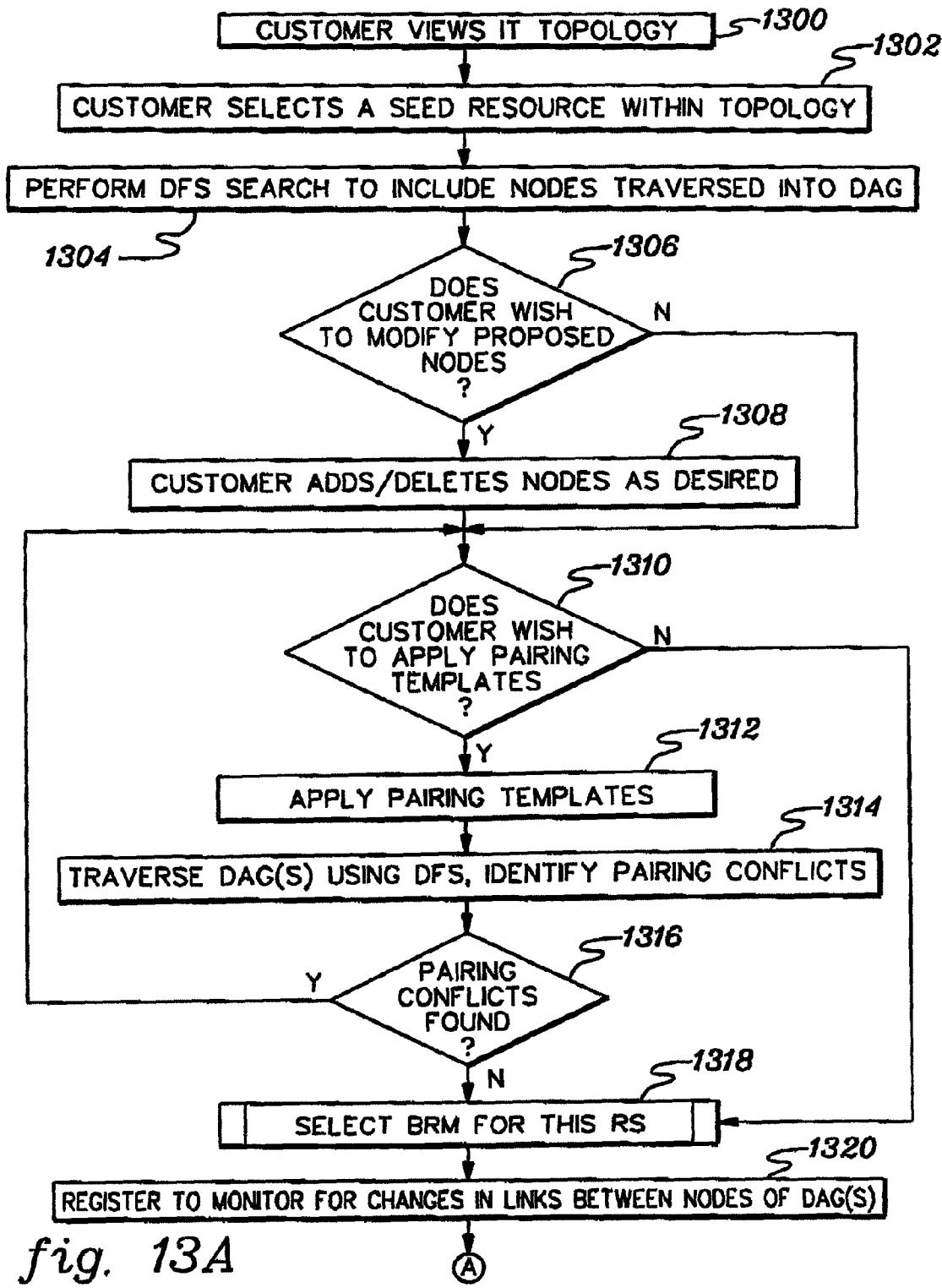
FIGS. 13A-13C depict one embodiment of the logic for creating a Recovery Segment, in accordance with an aspect of the present invention.
Figure 13B:
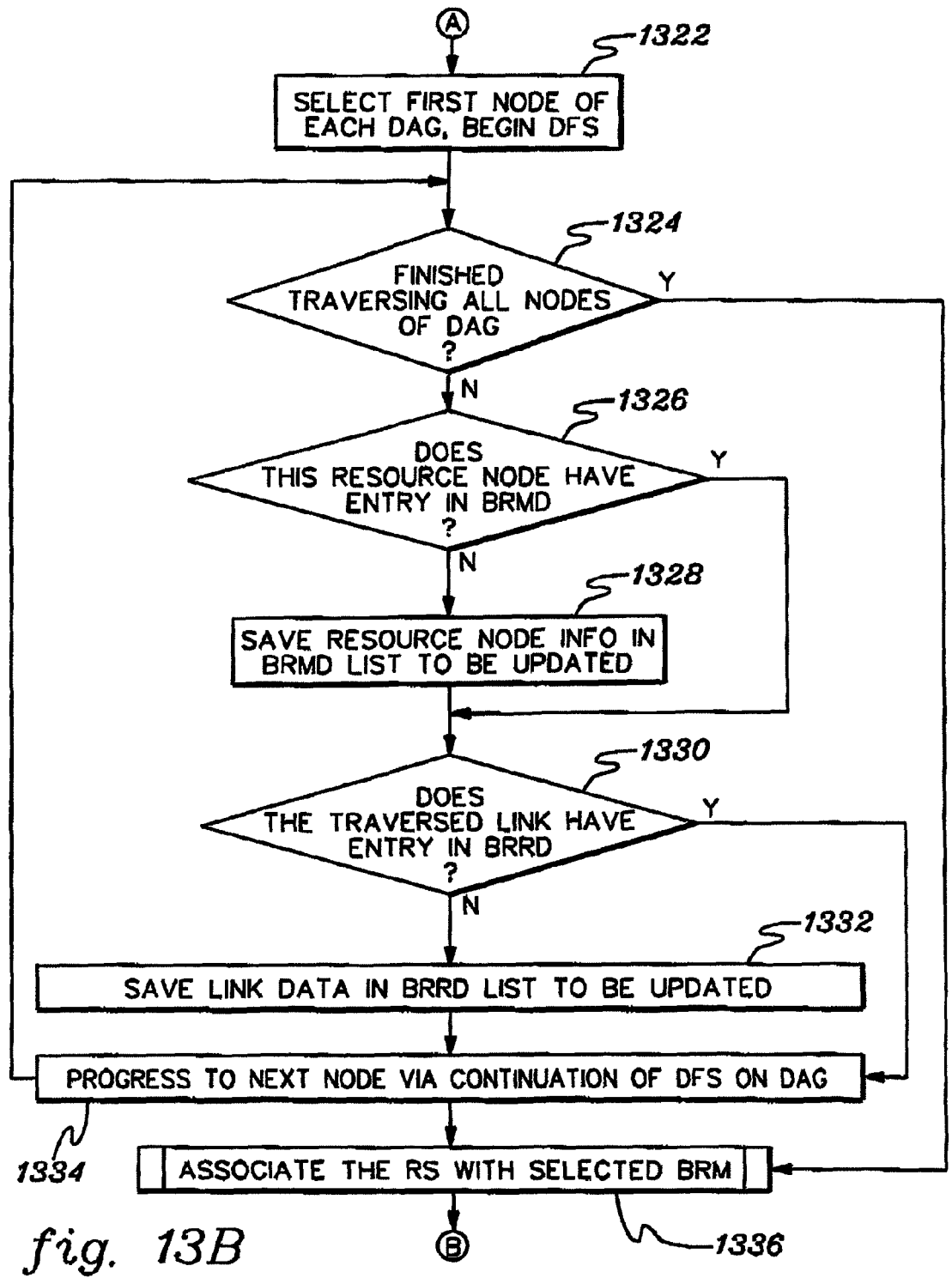
Figure 13C:
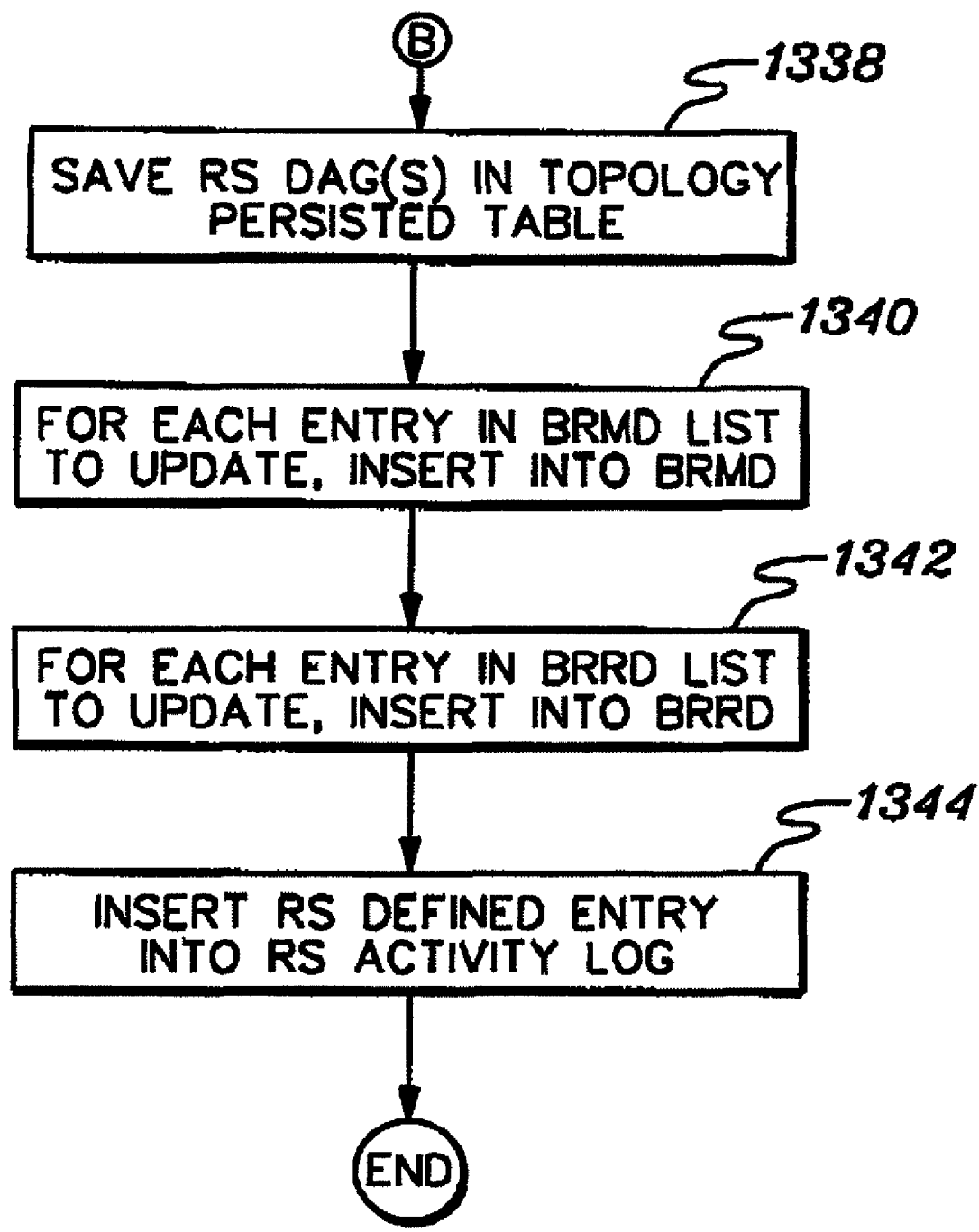
Figure 16:
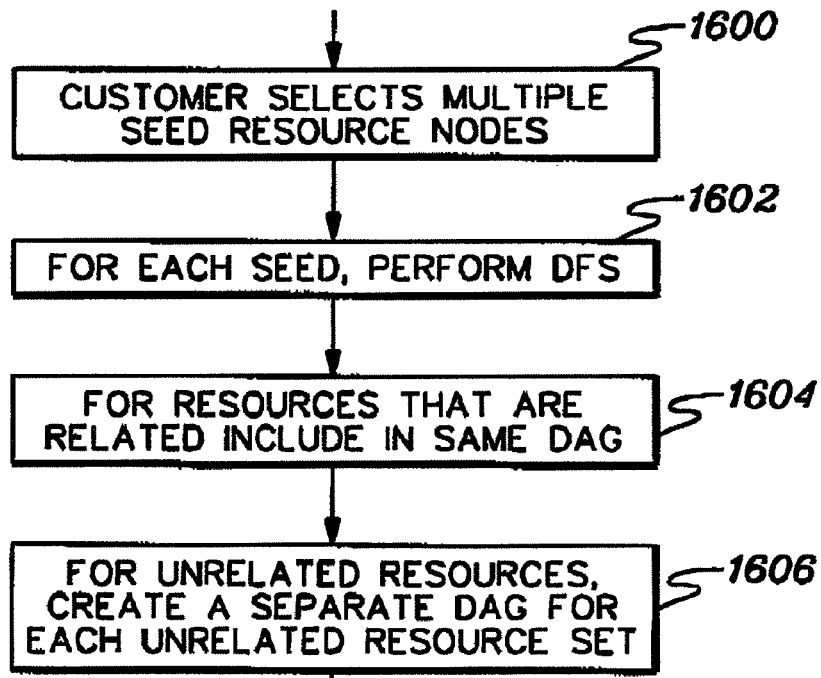
FIG. 16 depicts one embodiment of alternate logic used to create a Recovery Segment when more than one seed is provided, in accordance with an aspect of the present invention.

The creation of a new RS specifying more than one seed is similar to the flow for defining a new RS using a single seed, with an alternate flow defined for STEPS 1302 and 1304 of FIG. 13A. Initially, the customer views the IT topology, as in STEP 1300 of FIG. 13A. Next, in the alternate flow, an example of which is depicted in FIG. 16, the customer selects the multiple seeds desired for defining the RS via, for instance, a User Interface component, STEP 1600. Next, for each seed, a DFS is performed to create one or more DAGs, STEP 1602. That is, during the DFS search using the multiple seeds, there can be overlap causing the DFS to generate one DAG. It may also be true that the DFS generates multiple (disconnected) DAGs. For resources that are related, they are included in the same DAG, STEP 1604. For resources that are unrelated, they are included in a separate DAG for each unrelated resource set, STEP 1606. Next processing continues with STEP 1306 of FIG. 13A to determine if the customer wishes to modify the proposed resource topology. The remainder of the RS definition continues as described above.

In addition to the above, in another example, a RS can be created using RS definition templates. The creation of a new RS specifying RS Definition Templates is similar to the flow for defining a new RS using a single seed, with an alternate flow defined for STEPS 1302 and 1304 of FIG. 13A.

Figure 17:
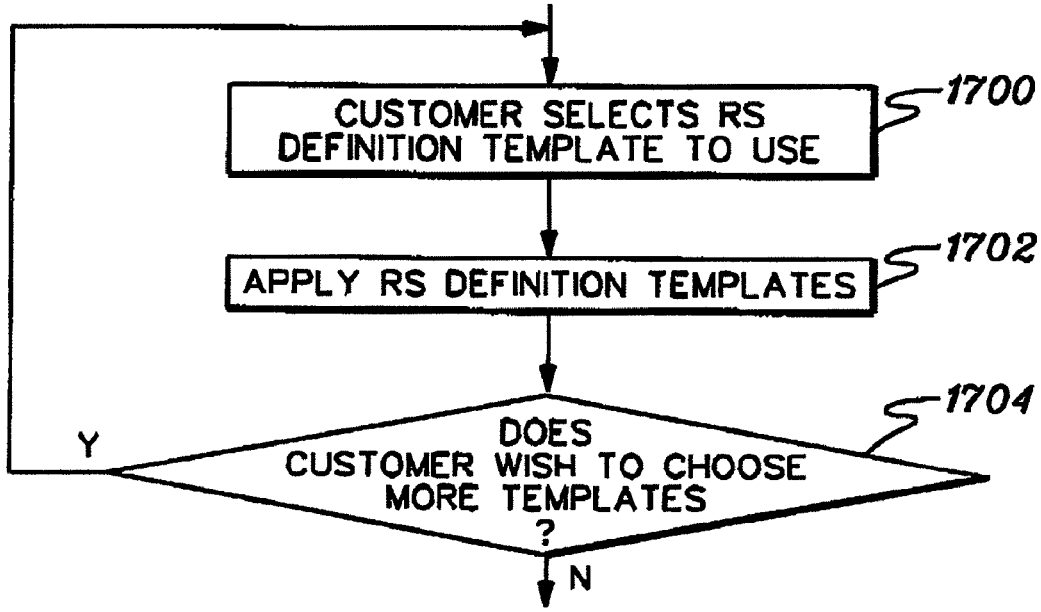
FIG. 17 depicts one embodiment of alternate logic used to create a Recovery Segment that employs definition templates, in accordance with an aspect of the present invention.

Initially, the customer views the IT topology, as in STEP 1300 (FIG. 13A). Next, in the alternate flow, an example of which is depicted in FIG. 17, a selection of RS Definition templates is performed by the customer, or through BR System recommendation based on resource type, and what is most applicable to the IT environment, STEP 1700, FIG. 17. Next, the selected templates are applied, STEP 1702, and instances of the patterns associated with the selected templates are shown to the customer via the User Interface Component. Next, the customer determines whether more templates should be applied to produce additional recommendations for the RS, INQUIRY 1704. If so, processing returns to STEP 1700 to allow the selection of additional templates. If no additional templates are desired, processing continues to INQUIRY 1306 (FIG. 13A) to determine if the customer wishes to modify the proposed resource topology, and the remainder of the RS definition continues as described above.

Persistence of a RS

Persistence for the Recovery Segment is provided and implemented as, for instance, a number of DB2 tables in the Business Resilience datastore that physically resides in the BR environment. That database is created at installation time, and the Recovery Segment tables are created and initialized (if necessary) at that time. As examples, there are two categories of data persisted for the Recovery Segment: those that are exposed externally via the resource properties, and those that are used internal to the BR-specific management logic. The access mechanism for the resource properties is, for example, via JDBC calls using type 4 drivers. To mitigate confusion and facilitate ease of maintenance, there is a very close match between the resource property name and the corresponding database field, in one embodiment.

Figure 18A:
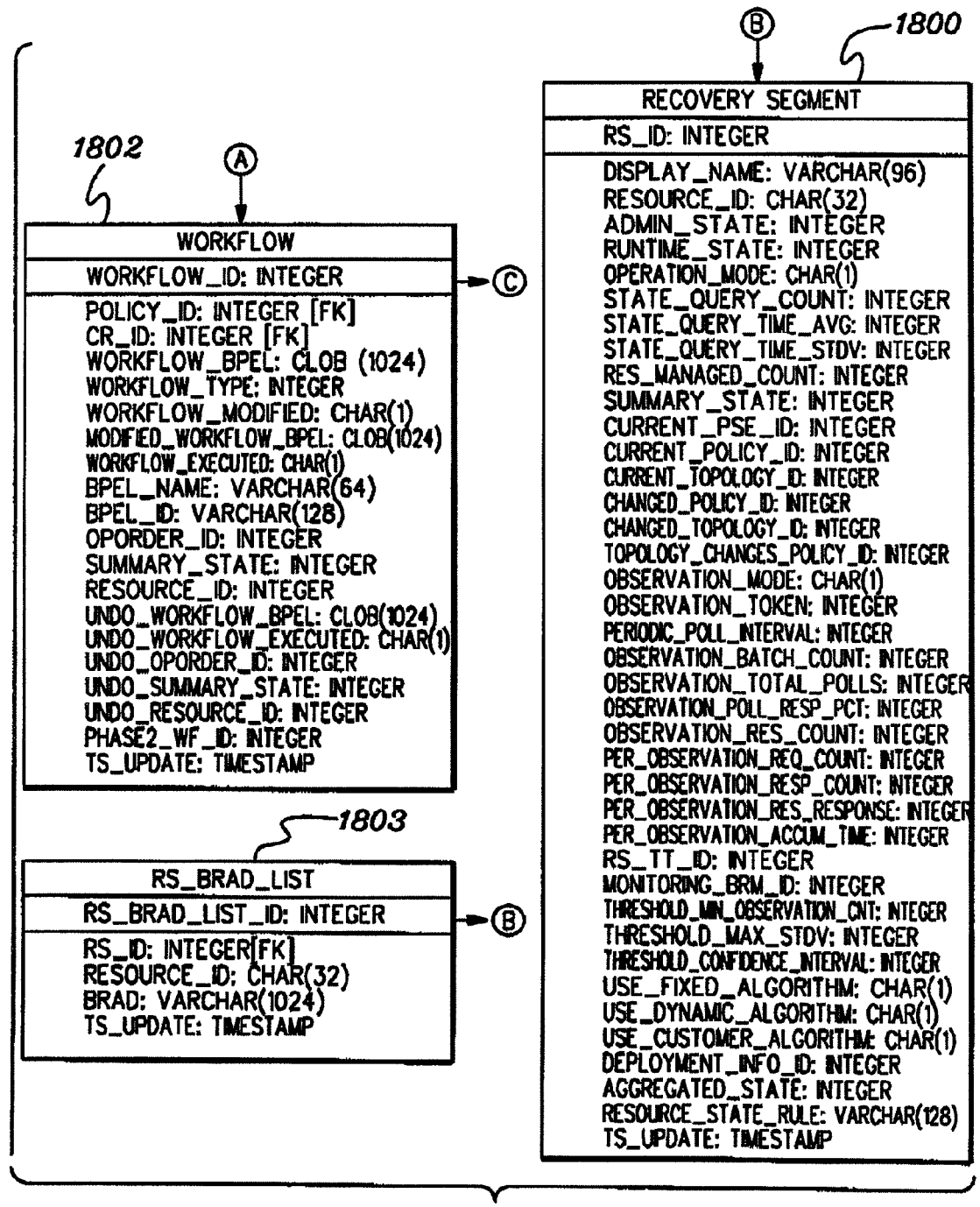
FIGS. 18A-18B depict one example of a physical model of a Recovery Segment and related tables, in accordance with an aspect of the present invention.
Figure 18B:
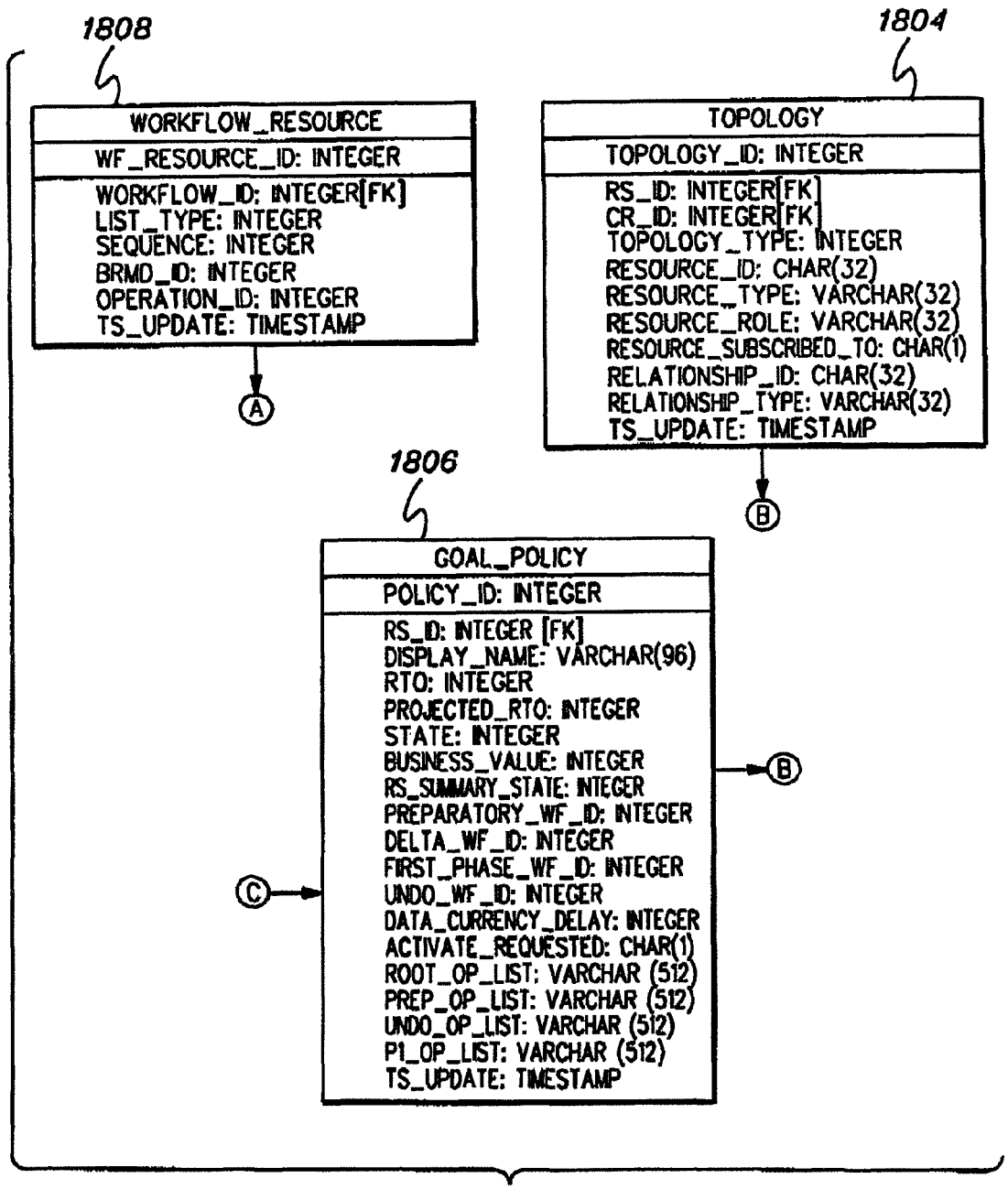

An example of the physical model of the Recovery Segment table (and any other related tables) is depicted in FIGS. 18A-18B. As shown, there is a Recovery_Segment table 1800 (FIG. 18A), a Workflow table 1802, a Brad List table 1803, a Topology table 1804 (FIG. 18B), a Goal_Policy table 1806, and a Workflow_Resource table 1808, each of which is described below.

In one example, Recovery_Segment table 1800 includes the singleton values associated with the RS. As an example, Recovery_Segment table 1800 includes the following:

| Data Field | Data Type | Description | Keys |
| --- | --- | --- | --- |
| RS_ID | Integer | Generated integer key for uniqueness via a DB2 sequence. Note all primary keys in the BR database will be a generated integer for compatibility with other non-DB2 databases. | Primary |
| DISPLAY_NAME* | Varchar(96) | Name as entered from the BR UI. DisplayName uniqueness for recovery segments will be enforced by the UI. | User |
| RESOURCE_ID* | Char(32) | The ResourceID resource property for this recovery segment | |
| ADMIN_STATE* | Integer | An index into the array of possible admin states: For example:<br>Defining<br>Defined<br>Prepared<br>Etc. | |
| RUNTIME_STATE* | Integer | An index into the array of possible runtime states:<br>1. Pending<br>2. Available<br>3. Unavailable<br>4. Etc. | |
| OPERATION_MODE* | Char(1) | 'A' for Advisory mode | |
| STATE_QUERY_COUNT | Integer | The total number of times that resource state queries have been performed in this RS | |
| STATE_QUERY_TIME_AVG | Integer | The moving average for state query execution times for all the resources in the RS. Used during the initial calculation of the T2 Interval in the CR Sliding Window algorithm. | |
| STATE_QUERY_TIME_STDV | Integer | The standard deviation for state query execution times for all the resources in the | |

| Data Field | Data Type | Description | Keys |
|---|---|---|---|
| | | RS. Used during the initial calculation of the T2 Interval in the CR Sliding Window algorithm. | |
| RES_MANAGED_COUNT | Integer | Number of resources managed by this RS | |
| SUMMARY_STATE | Integer | Summary state used for serialization and locking of this RS. Implemented as a DB2 sequence. | |
| CURRENT_PSE_ID | Integer | Index into the PSE array which indicates which PSE environment is active for this recovery segment (and policy) | |
| CURRENT_POLICY_ID | Integer | Key into the goal policy table that indicates which is the current active policy | |
| CURRENT_TOPOLOGY_ID | Integer | Key into the topology table that indicates which is the active topology | |
| CHANGED_POLICY_ID | Integer | Key into the goal policy table that indicates which is the changed policy | |
| CHANGED_TOPOLOGY_ID | Integer | Key into the topology table that indicates which is the proposed topology for the changed policy | |
| TOPOLOGY_CHANGES_POLICY_ID | Integer | Key into the goal policy table that indicates which policy to use for topology changes | |
| OBSERVATION_MODE* | Char(1) | The observation mode resource property for the RS | |
| OBSERVATION_TOKEN | Integer | Observation token. Implemented as a DB2 sequence. | |
| PERIODIC_POLL_INTERVAL* | Integer | The periodic poll interval for observation mode | |
| OBSERVATION_BATCH_COUNT | Integer | Number of resources to batch in each request to the BRAD. It starts at 20, but the periodic poll pacing algorithm adjusts higher or lower as necessary with each observation interval. | |
| OBSERVATION_TOTAL_POLLS | Integer | Accumulated number of periodic polls for this RS | |
| OBSERVATION_POLL_RESP_PCT | Integer | Moving average of the percentage of resources that have responded | |
| OBSERVATION_RES_COUNT | Integer | Number of resources polled | |
| PER_OBSERVATION_REQ_COUNT | Integer | Number of requests sent to the BRADs | |
| PER_OBSERVATION_RESP_COUNT | Integer | Number of responses received from the BRADs | |
| PER_OBSERVATION_RES_RESPONSE | Integer | Number of resources responding per observation | |
| PER_OBSERVATION_ACCUM_TIME | Integer | For a given observation the accumulated time of state query of all the resources that responded | |
| RS_TT_ID | Integer | Key into the transaction table for the "RS TT" entry for this RS | |
| MONITORING_BRM_ID | Integer | Key into the BR_MANAGER table that indicates which BRM is monitoring this RS | |
| THRESHOLD_MIN_OBSERVATION_CNT | Integer | | |
| THRESHOLD_MAX_STDV | Integer | | |
| THRESHOLD_CONFIDENCE_INTERVAL | Integer | | |
| USE_FIXED_ALGORITHM | Char(1) | Use fixed algorithm for sliding window algorithm. | |
| USE_DYNAMIC_ALGORITHM | Char(1) | Use dynamic algorithm for sliding window algorithm. | |

| Data Field | Data Type | Description | Keys |
| --- | --- | --- | --- |
| USE_CUSTOMER_ALGORITHM | Char(1) | Use user algorithm for sliding window algorithm. | |
| DEPLOYMENT_INFO_ID* | Integer | Key into the deployment information table for hosting OS and WAS for this RS | |
| AGGREGATED_STATE | Integer | | |
| RESOURCE_STATE_RULE | Varchar(128) | | |
| TS_UPDATE | Timestamp | Timestamp of initial create or last update and defaults to current timestamp | |

In the example provided above, the field names with an asterisk (*) represent the columns that are surfaced as the resource properties of the RS.

An example of Workflow table 1802 is described below.

| Data Field | Data Type | Description | Keys |
| --- | --- | --- | --- |
| WORKFLOW_ID | Integer | Generated integer key for uniqueness via a DB2 sequence. Note all primary keys in the BR database will be a generated integer for compatibility with other non-DB2 databases. | Primary |
| POLICY_ID | Integer | Foreign key from the policy table that can be used to retrieve all the workflows for a particular policy | Foreign |
| CR_ID | Integer | Foreign key from the containment region table that can be used to retrieve all the workflows for a particular containment region | Foreign |
| WORKFLOW_BPEL | Clob(1M) | BPEL workflow proper | |
| WORKFLOW_TYPE | Integer | The index into the array of workflow types supported by the BR. For example: 1. Preparatory 2. Recovery 3. Undo 4. Delta 5. Preventive 6. Phase 2 7. Etc. | |
| WORKFLOW_MODIFIED | Char(1) | Flag to indicate whether administrator modified the WF | |
| MODIFIED_WORKFLOW_BPEL | Clob(1M) | Modified workflow (if WF_Modified = 'Y') | |
| WORKFLOW_EXECUTED | Char(1) | Flag to indicate whether administrator chose to execute the generated or the modified WF | |
| BPEL_NAME | Varchar(64) | BPEL workflow name | |
| BPEL_ID | Varchar(128) | BPEL workflow UUID | |
| OPORDER_ID | Integer | Key into the workflow resource table to the list of resources and operations for workflow ordering | |
| SUMMARY_STATE | Integer | Recovery segment summary state at the time of the execution of this workflow | |
| RESOURCE_ID | Integer | Key into the workflow resource table to the list of resources | |
| UNDO_WORKFLOW_BPEL | Clob(1M) | Undo workflow for the Workflow_Type. Undo workflows are read-only from the BR UI | |
| UNDO_WORKFLOW_EXECUTED | Char(1) | Flag to indicate whether the unfo WF was executed | |

-continued

| Data Field | Data Type | Description | Keys |
|---|---|---|---|
| UNDO_OPORDER_ID | Integer | Key into the workflow resource table to the list of resources and operations for workflow ordering | |
| UNDO_SUMMARY_STATE | Integer | Recovery segment summary state at the time of the execution of this workflow | |
| UNDO_RESOURCE_ID | Integer | Key into the workflow resource table to the list of resources | |
| PHASE2_WF_ID | Integer | Key into the workflow table for the Phase 1 BPEL workflow (for preparatory workflows created by the RS) | |
| TS_UPDATE | Timestamp | Timestamp of initial create or last update and defaults to current timestamp | |

Further, an example of RS_Brad_List table 1803 is described below.

| Data Field | Data Type | Description | Keys |
|---|---|---|---|
| RS_BRAD_LIST_ID | Integer | Generated integer key for uniqueness via a DB2 sequence. Note all primary keys in the BR database will be a generated integer for compatibility with other non-DB2 databases. | Primary |
| RS_ID | Integer | Foreign key from the recovery segment table that can be used to retrieve all the resources (and associated BRAD) for a particular RS | Foreign |
| RESOURCE_ID | Char(32) | The ID of the resource | |
| BRAD | Varchar(1024) | The BRAD associated with the resource | |
| TS_UPDATE | Timestamp | Timestamp of initial create or last update and defaults to current timestamp | |

The Recovery Segment maintains a number of topologies—some exist as the active topologies in the RS, others exist for the purposes of RS scope change, policy change, etc. These topologies are persisted in DB2, but are also cached in the DB2 buffer pools for rapid access and traversal during recovery flows. One example of Topology table 1804 (FIG. 18B) is depicted below. It should be noted that this table is not used exclusively by the Recovery Segments in the BR environment, since DAGs are also included in containment regions. In the below table, field names with an (*) represent the columns that are surfaced as the resource properties of the RS.

| Data Field | Data Type | Description | Keys | Index |
|---|---|---|---|---|
| TOPOLOGY_ID | Integer | Generated integer key for uniqueness via a DB2 sequence. Note all primary keys in the BR database will be a generated integer for compatibility with other non-DB2 databases. | Primary | |
| RS_ID | Integer | Foreign key from the recovery segment table that can be used to retrieve all the topologies for a particular RS | Foreign | |
| CR_ID | Integer | Foreign key from the containment region table that can be used to retrieve all the topologies for a particular CR | Foreign | |
| TOPOLOGY_TYPE* | Integer | Index into the array of possible BR topologies:<br>1. Active<br>2. Changed<br>3. Impacted resource list<br>4. Etc. | | |
| RESOURCE_ID* | Char(32) | Resource ID | | |
| RESOURCE_TYPE* | Varchar(32) | Resource Type | | |
| RESOURCE_ROLE* | Varchar(32) | Resource Role (e.g., antecedent, dependent) | | |

-continued

| Data Field | Data Type | Description | Keys | Index |
|---|---|---|---|---|
| SUBSCRIBED_TO* | Char(1) | Flag to indicate that the resource is subscribed to. The index will return the unique set of resources that the caller is subscribed to (i.e., a resource that is in the DAG will not be in the list more than once). | | Yes |
| RELATIONSHIP_ID* | Char(32) | Relationship ID | | |
| RELATIONSHIP_TYPE* | Varchar(32) | Relationship type (e.g., manages) | | |
| TS_UPDATE | Timestamp | Timestamp of initial create or last update and defaults to current timestamp | | |

In addition to the above, one example of Goal_Policy table 1806 is depicted below.

| Data Field | Data Type | Description | Keys |
|---|---|---|---|
| POLICY_ID | Integer | Generated integer key for uniqueness via a DB2 sequence. Note all primary keys in the BR database will be a generated integer for compatibility with other non-DB2 databases. | Primary |
| DISPLAY_NAME | Varchar(96) | Name as entered from the BR UI. Display_Name uniqueness for policies will be enforced by the UI. | User |
| RS_ID | Integer | Foreign key from the recovery segment table that can be used to retrieve all the policies for a particular RS | Foreign |
| RTO | Integer | Recovery Time Objective for the goal | |
| PROJECTED_RTO | Integer | RTO as projected at policy validation time | |
| STATE | Integer | The index into the array of possible goal policy states. For example: 1. Defined 2. Validated 3. Activate Success 4. Etc. | |
| BUSINESS_VALUE | Integer | The index into the array of possible Business Value. For example: 1. Highest importance 2. 3. Medium importance 4. 5. Lowest importance | |
| RS_SUMMARY_STATE | Integer | Summary state for the RS when the policy was defined. Will be used to determine if the environment has changed since the policy was defined. Implemented as a DB2 sequence. | |
| PREPARATORY_WF_ID | Integer | Key into the workflow table that indicates this is the prep workflow for this policy. Prep workflows are viewable and editable from the BR UI. | |
| DELTA_WF_ID | Integer | Key into the workflow table that indicates this is the delta workflow for this policy. Delta workflows are view-only from the BR UI. | |
| FIRST_PHASE_WF_ID | Integer | Key into the workflow table that this is the $1^{st}$ phase workflow for this policy. $1^{ST}$ phase workflows are view-only from the BR UI. | |
| UNDO_WF_ID | Integer | Key into the workflow table that indicates this is the undo workflow for this policy. Undo workflows are view-only from the BR UI. | |
| DATA_CURRENCY_DELAY | Integer | Data currency delay is used to indicate how much delay in data currency the customer is willing to tolerate for any replicated or recovered data to be. The smaller the data currency the more stringent the replication parameters will be. For example, an immediate data | |

| Data Field | Data Type | Description | Keys |
|---|---|---|---|
| | | currency (i.e., 0) implies that the customer requires the primary and secondary storage volumes to be synchronously replicated. | |
| ACTIVATE_REQUESTED | Char(1) | | |
| ROOT_OP_LIST | Varchar(512) | | |
| PREP_OP_LIST | Varchar(512) | | |
| UNDO_OP_LIST | Varchar(512) | | |
| P1_OP_LIST | Varchar(512) | | |
| TS_UPDATE | Timestamp | Timestamp of initial create or last update and defaults to current timestamp | |

Lastly, one example of Workflow_Resource table 1808 is as follows:

| Data Field | Data Type | Description | Keys |
|---|---|---|---|
| WF_RESOURCE_ID | Integer | Generated integer key for uniqueness via a DB2 sequence. Note all primary keys in the BR database will be a generated integer for compatibility with other non-DB2 databases. | Primary |
| WORKFLOW_ID | Integer | Foreign key from the workflow table that can be used to retrieve all the resources and operations for a particular workflow | Foreign |
| LIST_TYPE | Integer | Index into the array of possible operation ordering lists:<br>1. Ordered root op list<br>2. Ordered prep op list<br>3. Ordered undo op list<br>4. P1 op list<br>5. Etc. | |
| SEQUENCE | Integer | Sequence of the resource/operation in the WF if the list type is for ordering (#1 above) | |
| BRMD_ID | Integer | Key into the BRMD table to identify the resource | |
| OPERATION_ID | Integer | Key into the operation list for the resource pointed to by the BRMD_ID field | |
| TS_UPDATE | Timestamp | Timestamp of initial create or last update and defaults to current timestamp | |

FURTHER EMBODIMENTS

Supported Configurations for Granular Management of Business Application Availability Subset, superset and shared RS support exists in multiple processes for the BR system, including, for instance, definition and deployment of RS, restrictions on subset RS definition, adding a subset RS to a superset RS, PSE and observation log considerations, monitoring and resource state retrieval processing, and recovery processing. There is additional processing employed to handle subset, superset and shared RS within these other processes, embodiments of which are described below.

Definition and Deployment of RS

Deployment of a subset RS or RS sharing resources with another RS is to occur with the same BRM instance as the related superset RS.

Further, RSs that share resources, or is a subset/superset of another RS are to be managed by the same BRM.

In creating a RS, as described above, the following may be inserted in support of subset, superset and shared resource support: At INQUIRY 1404 (FIG. 14), checking is performed for any shared resource. If so, STEP 1402 assigns the same BRM to RS instances sharing a resource.

Restrictions on Subset RS Definition

In one embodiment, a subset RS is to be defined, deployed and have a valid policy before a related superset is deployed. Processing guided by the UI task list used to add a subset RS to a superset RS enforces this restriction as described in the flow at STEP 1906 (FIG. 19A), described below.

The RTO of a subset RS cannot be greater than the RTO of a related superset RS which is enforced during policy validation on entry to validation of policy for the input policy and RS:

Following checks are to hold, in one example, otherwise Exit Error.

If changing policy on a subset RS, superset RS is to be in deact-monitor or deact-undo state.

If changing policy on a superset RS that includes a subset RS, both are to be in deact-monitor or deact-undo state.

In policy validation, as described below, after checking syntax of RTO specification, the topology is examined to determine if resources have operation execution timings required for policy validation and examination of any part of the topology which is a subset RS.

If topology element is a RS
   i. Verify that subset RS has RTO specification
      <RTO specification of the RS being validated.

Adding a Subset RS to a Superset RS

Figure 19A:
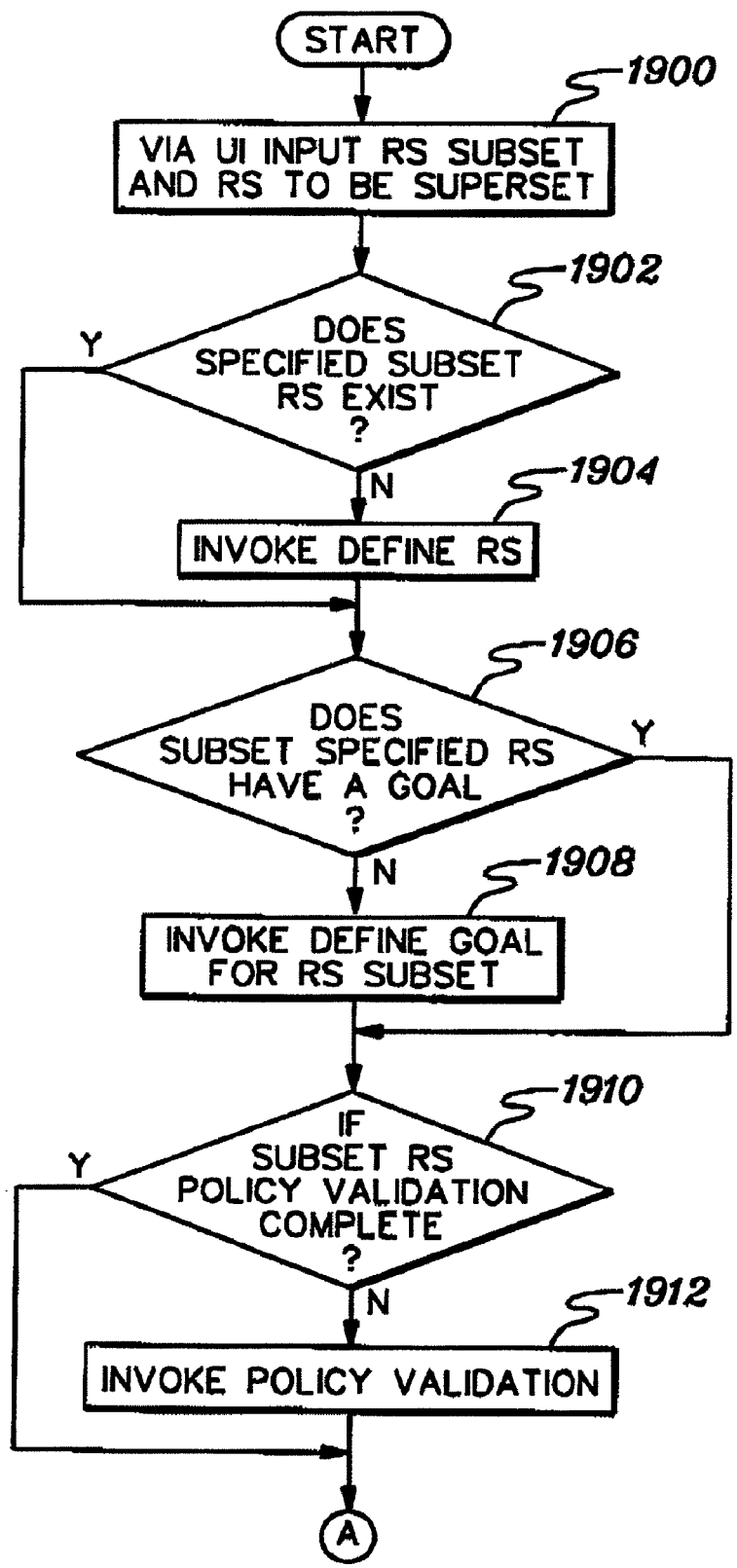
FIGS. 19A-19C depict one embodiment of the logic for adding a subset Recovery Segment to a superset Recovery Segment, in accordance with an aspect of the present invention.
Figure 19B:
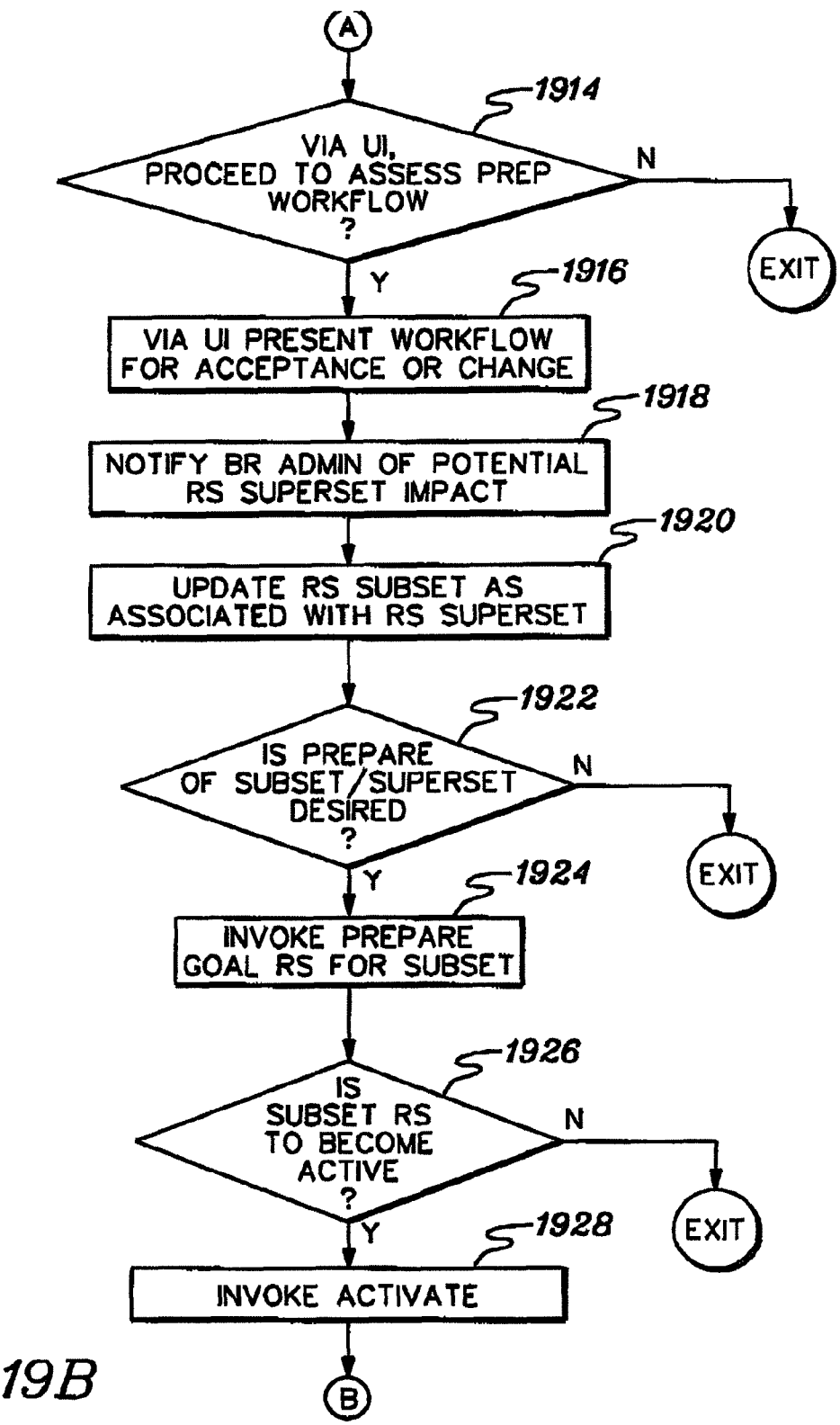

One embodiment of the logic for adding a subset RS to a Superset RS is described with reference to FIGS. 19A-19C. In this example, the processing is defined to have several UI tasks that are individually invoked and coordinated via the UI. Each task corresponds to a runtime flow that runs in a given transaction. There is no transaction scope for the entire process, so the results are shown to the customer at each task.

The following are the associated tasks, as an example:
Task1: The Subset RS is ensured to have a policy if it is defined
Task2: If not defined, define RS is invoked
Task3: If not acceptable goal, define goal
Task4: If not validated goal, validate goal is invoked
Task5: Customer wants to inspect and verify the workflow
Task6: Prepare Policy
Task7: Activate Policy Referring to FIG. 19A, processing is invoked through the BR UI input that defines the RS to be a subset and the associated RS to be the superset, STEP 1900. If the specified subset RS has not been defined, INQUIRY 1902, RS definition is invoked, STEP 1904. One embodiment of the logic for defining an RS is described above with reference to FIGS. 13A-13C.

Additionally, to become a subset RS, a valid goal is to be defined, INQUIRY 1906. If a goal is not defined, goal definition for the subset RS is invoked, STEP 1908, as described below.

If policy validation for the subset RS is required, INQUIRY 1910, policy validation processing is invoked, STEP 1912. Policy validation is described further in "Programmatic Validation in an Information Technology Environment," (POU920070111US1), which is hereby incorporated herein by reference in its entirety, and occurs in multiple discrete steps including, for example:

Checks for syntax
Checks that any subset policy being validated has a RTO less than that of a superset
Analyzes the operation timings for resource recovery operations, picking appropriate actions, and invokes the Gantt chart build to get a maximum path length time for recovering the resources
Invokes generate prep workflow to get back an ordered list of preparatory operations.

Further, if processing for preparatory workflow evaluation is desired, INQUIRY 1914 (FIG. 19B), validation or modification of the preparatory workflow is invoked through the UI, STEP 1916. Otherwise, processing is complete. If the customer wishes, the customer can pause processing at this point for any reason; for example, to define another RS, evaluate whether it is appropriate to keep the defined configuration, define other policies, etc.

On completion of workflow assessment, notification is provided to the BR administrator of potential impact to the RS superset resulting from association of the RS subset, STEP 1918, and the RS subset is marked as associated with the RS superset, STEP 1920. This updates a field in the RS showing it is a subset, and builds a pairing between the subset and superset RS in the BRRD so that the relationship is established.

If the subset RS goal is to be prepared for active BR management, INQUIRY 1922, prepare processing for the subset RS is invoked, STEP 1924. For example, preparing a policy submits the preparatory workflow generated from policy validation or from customer modification to the preparatory workflow. The BR administrator requests "Prepare Policy" via the BR admin UI. BR validates the current environment is unchanged from the environment that existed when the preparatory workflow was created. Notification is provided to the BR administrator if the policy is to be validated again and a new preparatory workflow created. BR presents the preparatory workflow the operations which are to execute immediately, in one example, prior to activation of the policy—termed phase 1 activate operations—for customer acceptance. If accepted, the preparatory workflow is submitted for execution and monitoring of the preparatory workflow is initiated. Monitoring includes observing changes in resource state for which preparatory operations have been initiated and monitoring of the progress of the workflow.

If the subset RS is to become actively managed by BR, INQUIRY 1926, the superset RS is to be actively monitored, STEP 1928. Policy activation is driven by an administrator when the administrator wants to make a policy current for monitoring of the RTO goal associated with the policy. As one example, activate examines the current PSE, compares it to the PSE(s) that are listed as part of the policy, and if they are the same, proceeds to activate. If they are not the same, activate marks the policy ActivateRequested, and does not activate until the PSEs for the policy become active. An RS with active monitoring for RTO achievement receives notification of changes to resources and performs evaluation of those changes. If recovery operations are required based on assessment of the state of the Recovery Segment, an evaluation of the scope of the outage is followed by formation of a recovery process.

Figure 19C:
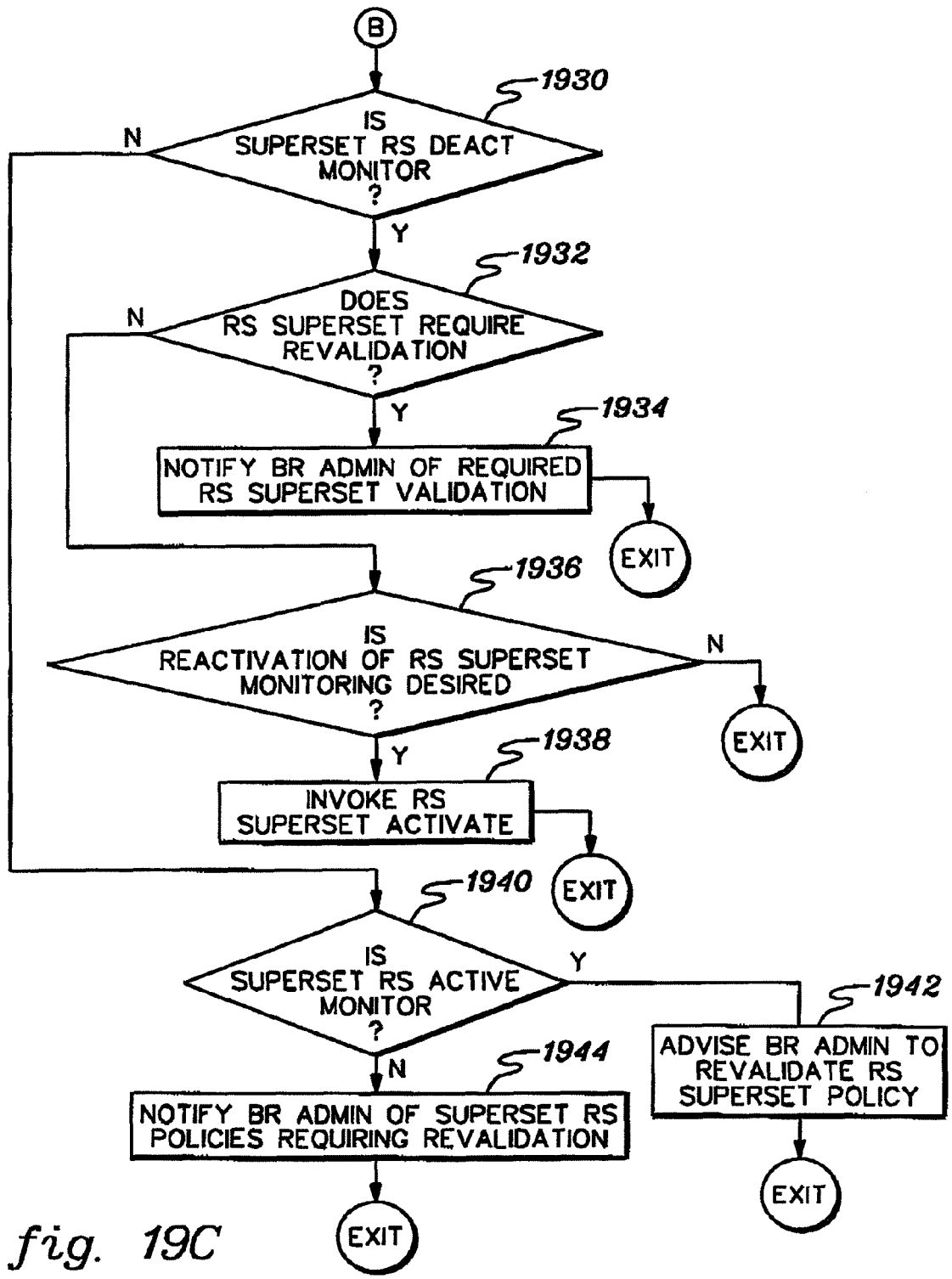

The superset RS may have become deactivated for monitoring as a result of a change caused through the preparation of the subset RS, INQUIRY 1930 (FIG. 19C). The most likely cause of a superset RS having become deactivated for monitoring is due to disruptive changes introduced in preparatory actions for the subset RS. Any disruptive changes would have been presented for acceptance to the BR administrator through the mailbox. If monitoring is deactivated, then a further determination is made as to whether the change to the RS superset configuration requires revalidation as reflected through the summary state of the RS superset having changed, INQUIRY 1932. If so, the BR administrator is notified of required RS superset policy validation, STEP 1934. Otherwise, the BR administrator may select to reactivate the superset RS for monitoring, INQUIRY 1936. If desired, RS superset activate is invoked, where activation of the superset is the same as described above.

Returning to INQUIRY 1930, if superset RS is not Deact Monitor, a further inquiry is made as to whether the superset RS state is ActiveMonitor, INQUIRY 1940. If so, there were changes to the resources in the superset RS, but they were nondisruptive and did not lower the prepared capabilities. Alternatively, disruptive changes caused this flow to validate the superset RS policy resulting in active monitoring for the superset RS. The BR administrator is advised to revalidate any other superset RS policies which are of continued interest, STEP 1942.

If the superset RS is not in a deactivate monitor or active monitor state, the superset RS was in a state of having validated policies which were not prepared or of having prepared but not activated policy at the time of subset RS preparation. If the customer attempts to activate any previously validated policy or prepare for any previously validated policy, notification will result indicating revalidation is required due to subset RS caused change. Processing completes by notifying the BR administrator of defined policies for the superset RS which will require revalidation now or at a future time, STEP 1944.

Associating Quantitative Availability Goals with RS

The BR System uses Recovery Segments as contexts for managing availability or other goals of multiple business applications. Each of these business applications may have requirements for availability (or other goals) that differ based on the criticality of the application, the impact of downtime, the resources used by the application, or the business needs associated with the application. The customer organization decides the desired availability for each application to be managed by the BR System.

The BR System provides a mechanism where the customer can associate a specific, quantitative goal for the availability of each business application. Quantitative specifications allow the customer to manage specific applications to achieve recovery within the targeted metrics, without requiring the customer to understand, coordinate, and explicitly alter each resource setting to achieve an overall availability metric that is aligned with business needs.

The following quantitative goals are given as examples of what can be used to manage the availability within the BR System, but others can be used as well (either in place of or in addition to those described below):

Recovery Time Objective (RTO)—indicates the maximum amount of time that a given application can be unavailable during any one outage, measured in units of time such as seconds, minutes, hours, days. One example is Application-C can be unavailable for no more than 60 seconds for any one outage.

Recovery Point Objective (RPO)—indicates how much data loss can be endured for a given application during any one outage, measured in units of time that represent the window of data loss, indicated in seconds, minutes, hours. One example is Application-B can incur only 2 seconds of data loss as a result of any outage.

Maximum Accumulated Downtime—indicates how much downtime a given application can incur over a period of time, measured in units of time across an extended timeframe. For example, Application-A can incur no more than 5 minutes of down in one month.

Figure 20:
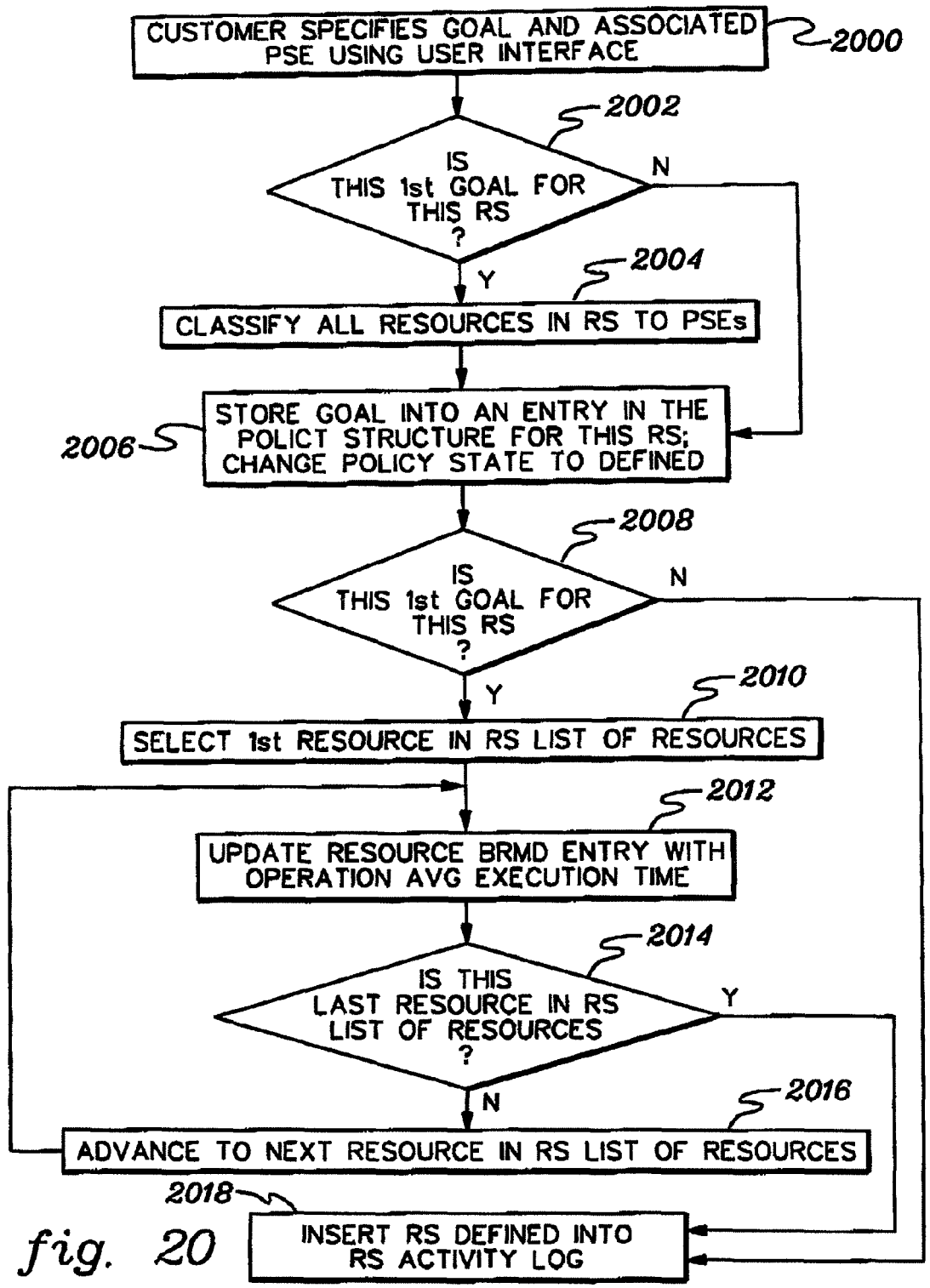
FIG. 20 depicts one embodiment of the logic for defining a quantitative goal and associating that goal with a Recovery Segment, in accordance with an aspect of the present invention.

The BR System provides a technique to define the quantitative goal and associate that with a RS, an example of which is described in FIG. 20. In one example, this logic is invoked and controlled via the UI component of the BR System, and supported by cooperative processing between the UI and RS components.

Referring to FIG. 20, initially, the customer specifies a quantitative goal to the BR System using the User Interface Component, STEP 2000. One example of such a goal is RTO specification in units of time. Next, the determination is made whether this is the first goal to be defined for this RS, INQUIRY 2002. PSE definition for this RS is to precede the goal specification for this RS, and the goal specification is not accepted by the User Interface component if PSEs are not available for this RS. If this is not the first goal, the goal is stored into one of the entries in the policy structure for this RS, and the policy state is changed to Defined, STEP 2006. More than one policy can be defined for this RS.

If this is the first goal for this RS, then each of the resources in the RS are classified to PSEs, STEP 2004. For instance, the key metrics of resources in the RS are considered an N-dimensional space. Distance formula, weighting factors for importance and conversion routines for making numeric values of non-numeric key metrics are applied from when the PSE was formed. A center of gravity for each PSE is determined. Each resource associated with the RS is processed. A set of observation records are selected which contain observation data for the resource based on customer specification of which observation logs are to be used. The center of gravity for each observation is determined using the distance formula, weighting factors and conversion routines used in forming the PSE. The distance from the center of gravity for the observation and the center of gravity for each PSE is calculated. The observation is classified to the PSE having the minimum distance from the observation.

After all the resources are classified, the goal is stored into the policy structure, STEP 2006. Next, a determination is once again made as to whether this is the first goal for this RS, INQUIRY 2008. If it is not the first goal to be defined, then an insert is made into the RS Activity Log indicating RS Defined, STEP 2018. If it is the first goal to be defined, then the first resource in the RS list is selected, STEP 2010. The BRMD entry for the resource is then updated with the operation average execution time, STEP 2012, as described herein. Then, if this is the last resource in the list, INQUIRY 2014, the sequence progresses to the insert into the RS Activity Log, STEP 2018. If this is not the last resource in the RS list of resources, INQUIRY 2104, then the next resource in the RS list is selected, STEP 2016, and processing cycles back to STEP 2012 to update the BRMD entry for the next resource. All resources are processed through STEPS 2010, 2012, 2104 and 2016. After the resources are processed, the sequence continues to STEP 2018, in which an insert is made into the RS Activity Log.

PSE and Observation Log Considerations

For shared resources, operation timings are categorized by PSE by RS. Therefore, there are multiple PSE(s) for a resource shared by multiple RS(s). The periodic sampling by the RS of the key RTO metrics and operation execution duration is accumulated into the running averages of the PSE associated with the RS for the shared resources. There can be different PSE environments across the RS set that share the resource. When a policy is validated for a RS, the BR administrator specifies the PSE(s) associated with the RS for which the policy is applicable. At recovery time, the date/time of error is used to select the one PSE that is applicable per RS sharing the resource. The operation time for recovery for the shared resource combines the statistics from the set of operation timings across any of the PSEs associated with the resource that match the date/time of error. Operation timing is the average of the runtime averages plus two standard deviations of the average of the averages. This forms a statistically sound view of the operation timing and addresses any skew in operation timing which might result from PSE environments that have large standard deviations in operation execution duration.

A shared RS, in one embodiment, has an associated policy. The policy for the shared RS is to be validated against a set of PSE(s) associated with the RS, as described with reference to STEP 1912 (FIG. 19A) above. Each resource associated with a shared RS will therefore have PSE(s) for operation execution time and key RTO metrics as defined for the RS with which they are associated.

A subset RS also has, in one embodiment, an associated policy. The PSE(s) for the subset RS may or may not be the same as the PSE(s) for the superset RS. Further, a subset RS may be shared by one or more superset RS(s). In order to build PSE(s) for the subset RS that are consistent with superset RS(s), the BR administrator is advised that enabling observation mode for a subset RS should also enable observation mode for the superset RS(s). During PSE build time, the BR administrator is advised that using observations for the set of resource(s) in the superset RS(s) and subset RS has the best chance of creating a set of PSE(s) that have consistent statistics for RTO metrics and operation execution duration across the set of subset and superset RS(s).

The following description itemizes cases for having the same or different PSE environments for a subset RS and its associated superset RS(s).

A first case exists where the subset RS and all superset RS(s) have the same PSE(s) reflecting date/time applicability of a PSE and PSE(s) with consistent statistics for key RTO metrics and operation execution duration timings. When building workflows (preparatory or recovery), how operation timings are formed depends on whether or not the resource is shared or not. For a resource which is not shared, operation timings are taken from the single set of PSE(s) associated with the resource. If the resource is shared, an average of the average for operation execution duration is taken from the set of PSE(s) associated with the resource. Twice the standard deviation of the average of average operation execution duration is added.

As one example, if the set of PSE(s) for the subset RS is the same as the set of PSE(s) for the superset RS(s), the BR administrator utilizes the same date/time ranges for applicability of PSE(s). This is a second case of subset RS support.

A third case of subset RS support exists in which the PSE(s) for superset RS(s) is not the same as the set of PSE(s) for a subset RS. Again, a given resource may be shared by more than one RS and the sharing RS(s) may be elements of the set of superset RS(s) or not. If a resource is not shared, there exists one set of PSE(s) associated with the subset RS. When building workflows (preparatory or recovery), operation timings are taken from the unshared resource based on the one and only current PSE for a given date/time. For a shared resource—by a superset RS or by a RS that is not a superset RS—there exists multiple PSE sets associated with the resource. When building workflows (preparatory or recovery), operation timings are formed as averages or the running average across the set of applicable PSE(s) with twice the standard deviation of the average or averages added.

Preparatory and Recovery Workflows

In building preparatory workflows, operations are selected to achieve the desired state of resources in advance of an outage in such a manner as to insure the recovery time goal can be met at time of an outage. Selection of operations preferred for recovery based on the prepared state of the environment may be extended to support subset, superset RS and shared resources. For example, where operation execution timing is being evaluated:

From the BRMD entry for the resource, locate each RS in which the resource participates and from the RS find each PSE that matches the input environment for validation. Retrieve operation timings for the operation that matches this one.

Take average of these plus two standard deviations of the average to be used as the operation execution duration in determining achievability of meeting the availability goal.

In building recovery workflows, operations are selected to achieve the desired state of resources. Two lists of potential recovery operations may be formed: a first list may include all currently viable recovery operations; a second list may include preferred recovery operations selected at the time the availability policy was validated. A routine for selection of operations is utilized and may be extended to support subset, superset RS and shared resources, as follows.

Where preferred recovery operations are being retrieved for recovery of a failed or degraded resource:

From the BRMD entry for the resource, locate each RS in which the resource participates and from the RS find any active policy. From each active policy, retrieve the preferred recovery operation list. Include the preferred recovery operation from each goal policy table in the set of preferred recovery operations.

Where recovery operations are being evaluated for selection of best candidate:

From the BRMD entry for the resource, locate each RS in which the resource participates and from the RS find each PSE which is currently active. Retrieve operation timings for the candidate recovery operation from the PSE operation table.

Select the candidate recovery operation having the minimum execution time duration.

Observation Log Record Considerations for Shared Resources Across RSs

A shared resource for which more than one RS has active observation processing has observation log records recorded in the observation logs associated with each RS. The timing of recording of observation log records varies among the RSs. The property and values, as well as operation execution timings, for a resource is the same in the multiple logs. However, the set of associated resources is different.

In processing observation log records to form PSE(s), duplicate information on resource execution times is corrected.

Monitoring and Resource State Retrieval Processing

A Recovery Segment for which BR is providing active monitoring for achievement of availability goal may initiate recovery processing either when explicit notification is received or when periodic requests for resource state reflect a resource entering a failed or degraded state. When an outage has been detected, BR formulates a timeline for management of the recovery phases termed a "sliding window". The time line is determined by the availability goal. For a recovery time objective, the RTO determines the overall timeline from outage detection to recovery processing completion. BR divided this overall timeline into four intervals demarked by five points in time, termed T1, T2, T3, T4 and T5.

T1 represents the point in time when the first outage of a related set of outages is detected.

An interval of time from T1 to T2 is allowed to pass during which subsequent events for the same or related resources report outage(s). Delay of recovery processing for this interval enables correlation of related failure while still meeting the specified RTO. At time point T2 a query is initiated for state of resource(s) which have been detected or reported as having an outage with a common cause.

Gathering of resource stat data subsequent to the last reported outage continues to a point in time demarked by T3. During the interval T2→T3 resource state data is retrieved and correlation of new outage reports may be incorporated into an outage event being processed.

At the point in time demarked by T3, no further events may be incorporated into the outage event being processed and current resource state data is to be available. The interval of time from T3 to T4 is used by BR to formulate a recovery process. At the point in time demarked by T4, the recovery process formed by BR is initiated. The recovery process executes between the point in time T4 to T5.

In sliding window processing, the following processing may be included:

For RS that may be subset or superset the calculation of T2/T3 is based on

T2 set from the RS having the lowest RTO based on avg and std dev of response to resource query for state.

T3 set from the RS having the resource with the longest time to respond to resource state query based on avg, std dev and max response to resource query for state.

Deactivation

A Recovery Segment may be deactivated for monitoring through explicit BR administrator request or unrecoverable failure of the recovery segment processing.

A superset RS is to be deactivated for monitoring, if the subset is deactivated for monitoring. In RS deactivation (for monitor and undo of the RS) the following may be included:
  Unsubscribe to resources that have direct managed relationships to the RS being deactivated.
    Do not automatically deactivate inner RS if subsets exists.

Recovery Processing

As part of the recovery processing performed by BR, related resource outages and associated data are maintained in a Containment Region. A new containment region is formed on the initial report of an outage and may be added to if subsequent, related outages are reported or detected through monitoring. Referring to the intervals of recovery processing above, a containment region may be constructed subsequent to T1 for an initial outage report. Additional resources may be added to a containment region up to the time demarked by T3.

In creating a containment region, the following may be added. In the routine which creates a new containment region, initialization of the sliding window occurs including invocation of a routine which calculates the intervals.

In associating a new event with an existing containment region, the following may be added. In the routine which adds a resource to an existing containment region the sliding window values are updated by invoking a routine which calculates the intervals.

Customers may choose one of three techniques to establish a timing framework for containment region processing, as described further in "Management of Computer Events in a Computer Environment," (POU920070118US1), which is hereby incorporated herein by reference in its entirety:
1. The default algorithm uses the average time for query responses and the maximum time for query response to establish the timing framework;
2. The customer can specify arithmetic operations on the average and maximum query response times to establish the timing framework;
3. A "Dynamic provided algorithm", which uses average and maximum query response times, average time to build a containment region, and the Gantt chart of recovery operations to get a time needed to complete processing of recovery operations to establish the timing framework.

Within the routine which calculates the intervals, if the dynamic provided algorithm is to be used, the following may be added where the time for performing recovery operations is estimated—the T4 to T5 time:
  i. If shared resource, take op timings from applicable PSEs, and take average of those.
  ii. If not shared resource, take op timing from the one applicable PSE.
  iii. Op timing to use for Gantt chart=calculated op timing+ 2×Std deviation of op timing.

Additional Management Via the UI

Figure 21:
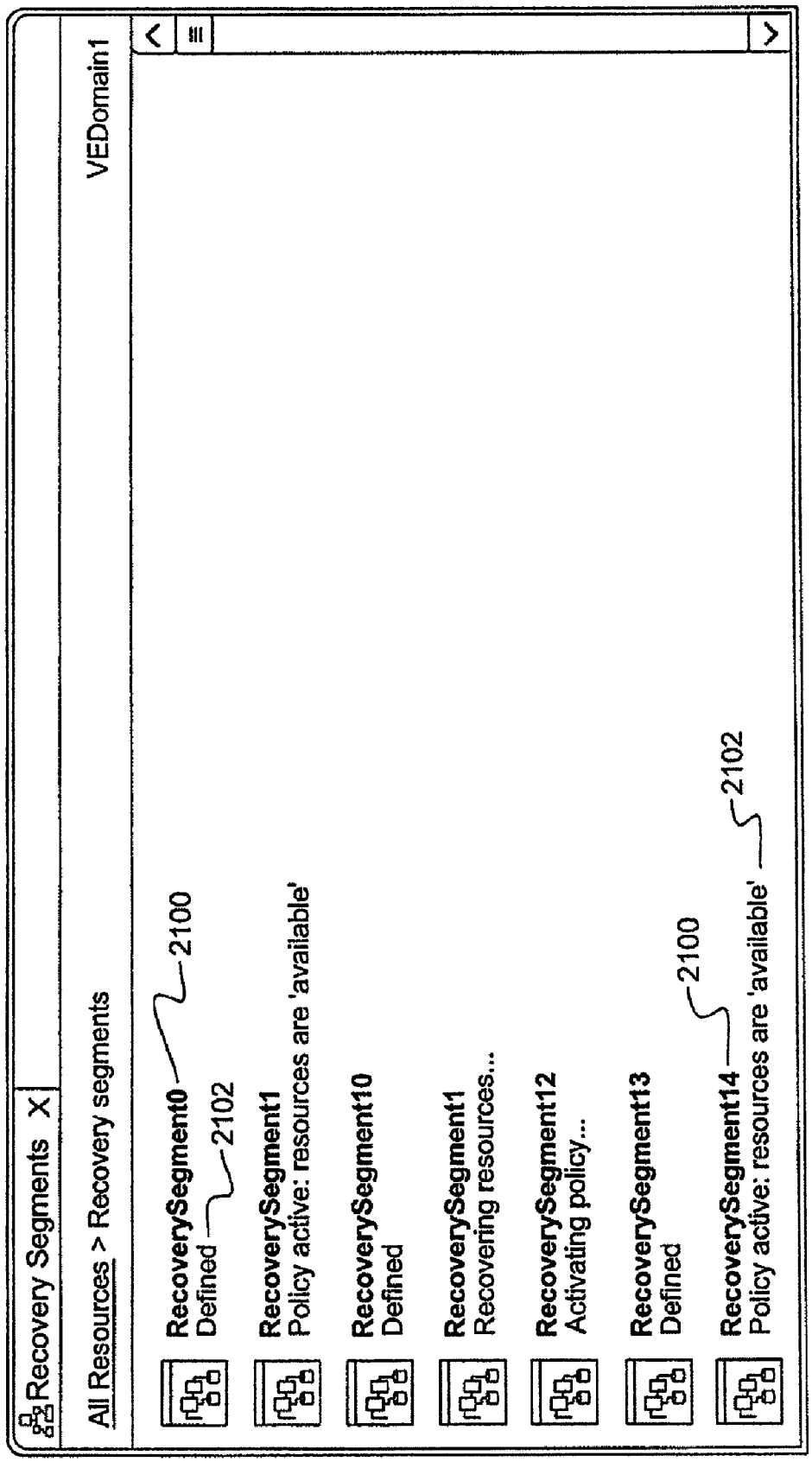
FIG. 21 depicts one example of a screen display illustrating a plurality of Recovery Segments with their associated states, in accordance with an aspect of the present invention.

A Recovery Segment can be managed via, for instance, the UI. As an example, a user can view defined Recovery Segments for the environment by opening a Recovery Segment list, as depicted in FIG. 21. As shown in FIG. 21, Recovery Segments 2100 are listed, along with their state 2102.

The Recovery Segment's state is employed in the management of the Recovery Segment. Depending upon artwork, the icon of the Recovery Segment may be modified to reflect its current state.

As one example, the BR UI is used to display the customer's IT environment in a graphical manner in the form of topologies. An administrative person may then select nodes from a rendered topology to initially define their Recovery Segment. They may then augment the Recovery Segment by adding additional resources or selectively removing resources that are of no interest.

Before definition is allowed, the user selects a BRM to manage the Recovery Segment when it is deployed. The user can chose from a list of defined BRMs or they can select to create and deploy a new one. Once the new BRM is created and deployed, it can then be associated with the Recovery Segment and the Recovery Segment is deployed at the BRM's location.

Once the Recovery Segment is defined, it is instantiated and attached to the constituent resource(s) with "manages" relationships. Recovery Segments are user-defined and their contents are left to the discretion of the customer. However, some level of advice related to "best practices" can be provided to the end user so that Recovery Segments are created and configured properly for the environment that is to be managed for the purposes of BR.

Figure 22:
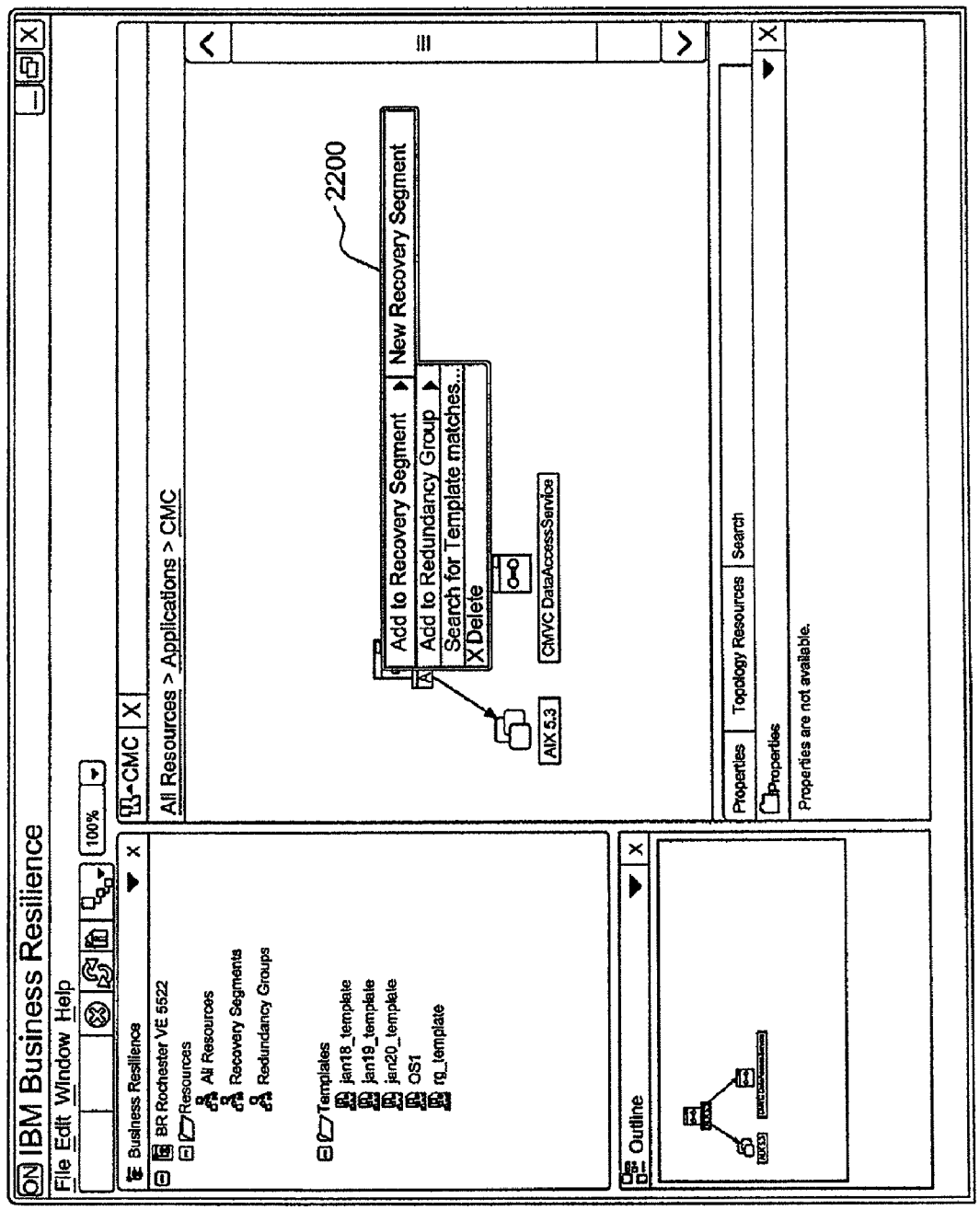
FIG. 22 depicts one example of a screen display used to create a Recovery Segment, in accordance with an aspect of the present invention.

In one embodiment, a typical flow has the user locating the resources they want to add to a Recovery Segment. These can be found using templates or by the user manually navigating their environment's topology to the desired resources. The user may then select one or more resources in the topology, as depicted in FIG. 22, right click on them, and select "New Recovery Segment" 2200. This will start the process of creating a Recovery Segment to include the selected resources.

In one embodiment, the user has the following choices while editing the Recovery Segment, as examples:
1. Exit without saving the Recovery Segment.
2. Save the Recovery Segment. Once it has been saved, it is displayed in other views like any other Resource.
Modify the Recovery Segment before saving:
  Add a resource to the Recovery Segment by dragging and dropping it into the editor, by using the common browse dialog to find the resource, or by finding the resource in the topology and using the add context menu action.
  Remove a resource from the Recovery Segment.
  View or modify the BR management data for resources within the Recovery Segment.
  View or modify the policies, statistics, properties, or state aggregation defined for the Recovery Segment.

When a Recovery Segment instance occurs in the UI, the following actions can be taken, as examples:
1. A Recovery Segment can be deleted as long as it is not active. The deletion does not impact any of the constituent resources in the Recovery Segment.
2. A Recovery Segment, active or inactive, may be assigned to a BR manager for management by selecting and right-clicking on the Recovery Segment to display a list of all the available BR managers. From this list, a BRM for the Recovery Segment can be assigned.
3. A Recovery Segment can be opened to modify its membership.
4. Its properties can be modified.

The user can select resources within the Recovery Segment and modify their BR Management Data.

The RS can monitor resources which may be dependencies or otherwise related to the resources it will be recovering.

Figure 23:
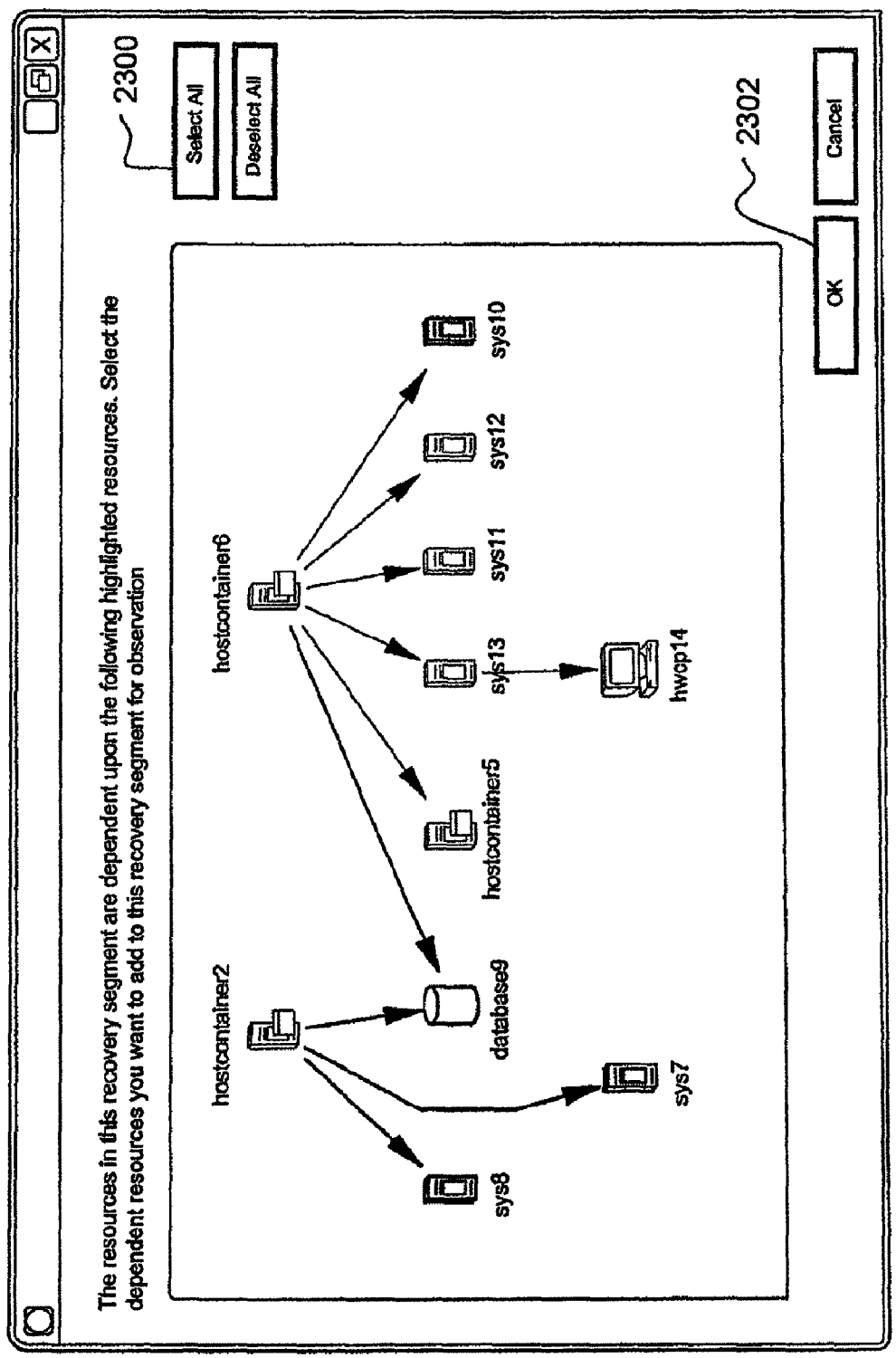
FIG. 23 depicts one example of dependent resources of a Recovery Segment, in accordance with an aspect of the present invention.

These dependent resources can be added to the Recovery Segment by the user selecting to add dependent resources for a Recovery Segment or individual resource. This will display a dialog containing dependent resources for the selected Recovery Segment or resource, as depicted in FIG. 23. The user can then select all 2300 or individually the resources they want to add to the Recovery Segment as an assessed resource.

In one example, the user flow is as follows:
1. User selects "Add dependencies . . . " on a Recovery Segment or member resource.
2. The UI scans each node in the Recovery Segment for a child topology. Any node not already in the Recovery Segment is added to the list of dependencies.
3. The dependencies display in a topology for viewing or in a tree, where each root node is a root in the tree and expanding it shows the resources it depends on that would be added.
4. After selecting the resources to add, the user can select OK 2302 to add the resources to the Recovery Segment.

The user can also choose whether or not the RS is actively monitoring the resource by checking or unchecking the resource in the resource table for the RS. This allows the user to select which resources should be monitored for recovery. By default, resources added to a Recovery Segment are checked. When the user unchecks a resource in a Recovery Segment, its icon will take on a marker to signify that it is only being observed and is not being actively managed.

Described in detail herein is a capability for creating a machine readable, machine editable, runtime usable representation of resources and their relationships, and using that representation to manage a business application. As examples, the resources may include, but are not limited to, processors, storage, network, middleware (e.g., dbms, transaction system, message system, web services), applications, programmatic representations of staff actions. A resource may be, for example, any entity having a representation that includes properties, associated values, operations and relationships.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 24:
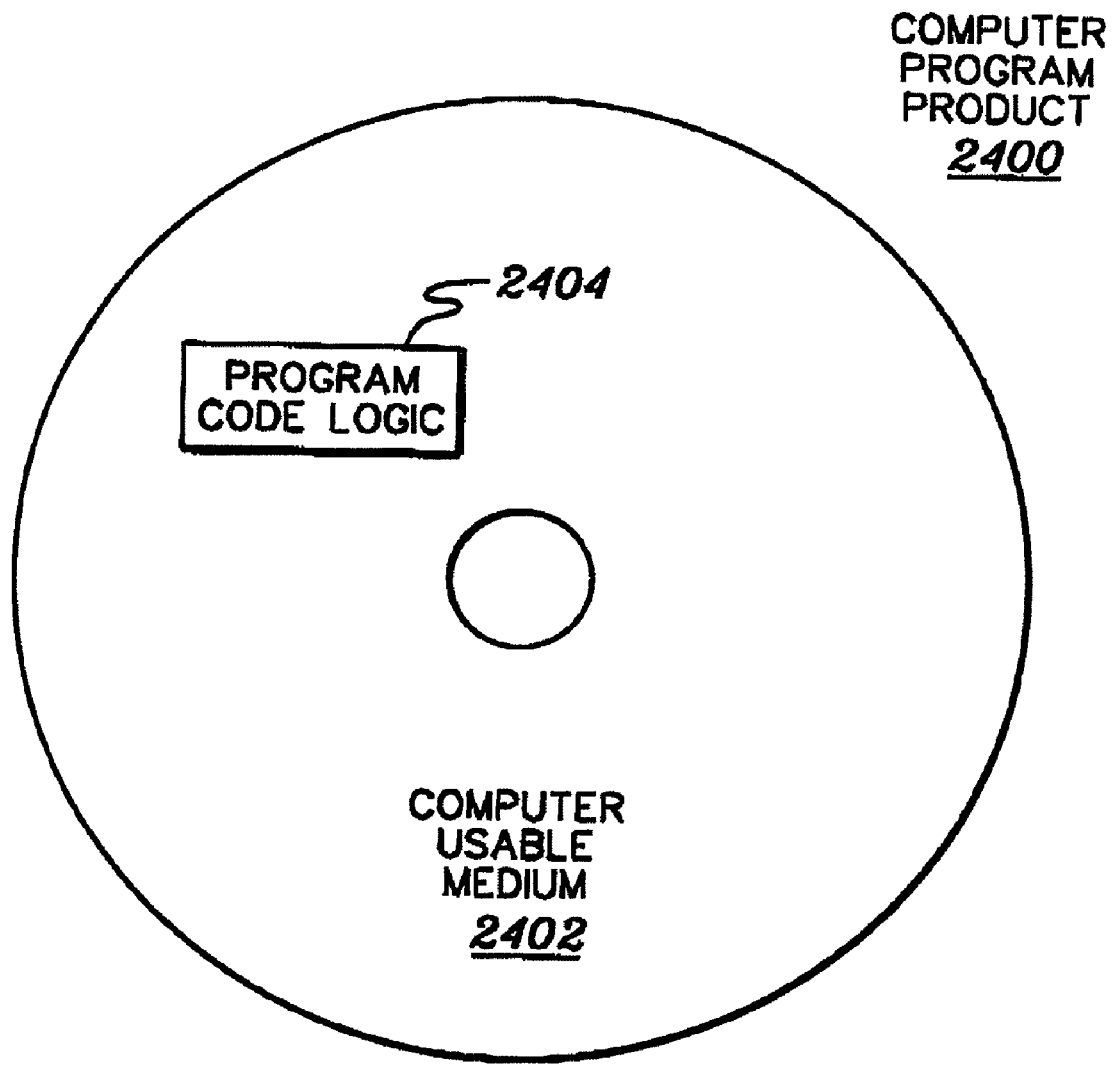
FIG. 24 depicts one embodiment of a computer program product incorporating one or more aspects of the present invention.

One example of an article of manufacture or a computer program product incorporating one or more aspects of the present invention is described with reference to FIG. 24. A computer program product 2400 includes, for instance, one or more computer usable media 2402 to store computer readable program code means or logic 2404 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for creating a runtime usable representation of a set of information associated with a business application, in which that representation is usable in managing the business application. The set of information includes, for instance, an identification of a plurality of resources associated with the business application and relationship information for those resources. Associated with the representation are one or more quantified goals, such as availability goals indicating one or more availability requirements of the plurality of resources of the representation.

Although various embodiments are described above, these are only examples. For example, the processing environments described herein are only examples of environments that may incorporate and use a Recovery Segment and/or one or more other aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, in the tables described herein, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which a RS may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, situations and the like can be made without departing from the spirit of the invention and these are therefore considered to be within the scope of the invention as defined in the following claims.

What is claimed is:

1. A computer implemented method comprising:

creating a runtime usable representation of a business application, said representation including a logical grouping of one or more resources of the business application and one or more relationships associated with one or more resources of the business application, wherein the creating comprises storing information regarding the one or more resources in at least one externally accessible location, the information including at least one of properties of the one or more resources, values of the one or more resources, and operations to be performed that are associated with management of the business application;

associating with the runtime usable representation of the business application an explicit quantifiable goal used to manage the business application; and managing, by a processor, at run-time, the representation of the business application to achieve the explicit quantifiable goal associated with the runtime usable representation of the business application.

2. The computer implemented method of claim 1, wherein the information includes current runtime values for at least one of: one or more of the properties or one or more of the operations.

3. The computer implemented method of claim 1, wherein a relationship of the one or more relationships comprises one of a dependency relationship in which one resource is dependent on another, a co-location relationship, an ordering relationship, or an effect relationship.

4. The computer implemented method of claim 1, wherein the quantifiable goal comprises an availability goal indicating one or more availability requirements of one or more resources of the representation.

5. The computer implemented method of claim 4, wherein the availability goal comprises at least one of a recovery time objective that indicates a maximum amount of time the business application can be unavailable during an outage, a recovery point objective that indicates how much data loss can be endured for the business application during an outage, or a maximum accumulated downtime that indicates how much downtime the business application can incur over a period of time.

6. The computer implemented method of claim 1, wherein the creating comprises creating the representation based upon one or more customer provided seed resources.

7. The computer implemented method of claim 1, wherein one or more resources are automatically recommended to be included in the representation based on one or more relationships associated with one or more other resources of the representation.

8. The computer implemented method of claim 1, wherein the representation further includes another set of information.

9. The computer implemented method of claim 8, wherein the another set of information is unrelated to the set of information.

10. The computer implemented method of claim 1, wherein at least one resource of the plurality of resources does not have an express relationship with the other resources of the plurality of resources.

11. The computer implemented method of claim 1, wherein the representation is a subset of another representation.

12. The computer implemented method of claim 1, wherein the representation is a superset of another representation.

13. The computer implemented method of claim 1, wherein at least one resource of the representation is shared with another representation.

14. The computer implemented method of claim 1, wherein at least one resource of the plurality of resources comprises a processor, storage, network, middleware, an application, or a programmatic representation of a staff action.

15. A computer system comprising:
a memory; and
a processor in communications with the memory, wherein the computer system is configured to perform a method, said method comprising:
creating a runtime usable representation of a business application, said representation including a logical grouping of one or more resources of the business application and one or more relationships associated with one or more resources of the business application, wherein the creating comprises storing information regarding the one or more resources in at least one externally accessible location, the information including at least one of properties of the one or more resources, values of the one or more resources, and operations to be performed that are associated with management of the business application;
associating with the runtime usable representation of the business application an explicit quantifiable goal used to manage the business application; and
managing, by a processor, at run-time, the representation of the business application to achieve the explicit quantifiable goal associated with the runtime usable representation of the business application.

16. The computer system of claim 15, wherein a relationship of the one or more relationships comprises one of a dependency relationship in which one resource is dependent on another, a co-location relationship, an ordering relationship, or an effect relationship.

17. The computer system of claim 15, wherein one or more resources are automatically recommended to be included in the representation based on one or more relationships associated with one or more other resources of the representation.

18. The computer system of claim 15, wherein at least one resource of the plurality of resources does not have an express relationship with the other resources of the plurality of resources.

19. The computer system of claim 15, wherein the representation is at least one of a subset of another representation, a superset of another representation, or is shared with another representation.

20. A computer program product comprising:
a non-transitory computer readable storage medium readable by a processor and storing instructions for execution by the processor for performing a method comprising:
creating a runtime usable representation of a business application, said representation including a logical grouping of one or more resources of the business application and one or more relationships associated with one or more resources of the business application, wherein the creating comprises storing information regarding the one or more resources in at least one externally accessible location, the information including at least one of properties of the one or more resources, values of the one or more resources, and operations to be performed that are associated with management of the business application;
associating with the runtime usable representation of the business application an explicit quantifiable goal used to manage the business application; and
managing, by a processor, at run-time, the representation of the business application to achieve the explicit quantifiable goal associated with the runtime usable representation of the business application.

21. The computer program product of claim 20, wherein a relationship of the one or more relationships comprises one of a dependency relationship in which one resource is dependent on another, a co-location relationship, an ordering relationship, or an effect relationship.

22. The computer program product of claim 20, wherein the creating comprises creating the representation based upon one or more customer provided seed resources.

23. The computer program product of claim 20, wherein one or more resources are automatically recommended to be included in the representation based on one or more relationships associated with one or more other resources of the representation.

24. The computer program product of claim 20, wherein at least one resource of the plurality of resources does not have an express relationship with the other resources of the plurality of resources.

25. The computer implemented method of claim 1, wherein the managing comprises:
selecting an operation of one or more operations to manage the runtime usable representation;
selecting an operation timing for the selected operation, wherein the operation timing for the selected operation is computed using runtime averages for the selected operation; and
using the selected operation and the selected operation timing in managing the runtime usable representation to meet the explicit quantifiable goal.

* * * * *